United States Patent
Cyman, Jr. et al.

(10) Patent No.: US 10,106,710 B2
(45) Date of Patent: Oct. 23, 2018

(54) INSULATOR MATERIAL COMPOSITION AND METHOD

(71) Applicant: R.R. DONNELLEY & SONS COMPANY, Chicago, IL (US)

(72) Inventors: Theodore F. Cyman, Jr., Grand Island, NY (US); Kevin J. Hook, Grand Island, NY (US); Pamela Geddes, Alden, NY (US); Alan R. Murzynowski, Grand Island, NY (US); James W. Blease, Avon, NY (US); Daniel E. Kanfoush, Grand Island, NY (US)

(73) Assignee: R.R. Donnelley & Sons Company, Chicago, IL (US)

( * ) Notice: Subject to any disclaimer, the term of this patent is extended or adjusted under 35 U.S.C. 154(b) by 302 days.

(21) Appl. No.: 14/541,103

(22) Filed: Nov. 13, 2014

(65) Prior Publication Data

US 2015/0140310 A1    May 21, 2015

Related U.S. Application Data

(60) Provisional application No. 61/903,816, filed on Nov. 13, 2013, provisional application No. 61/903,829, (Continued)

(51) Int. Cl.
*H01B 3/00* (2006.01)
*C09J 133/14* (2006.01)
(Continued)

(52) U.S. Cl.
CPC ............... *C09J 133/14* (2013.01); *B05B 1/02* (2013.01); *B05B 15/60* (2018.02);
(Continued)

(58) Field of Classification Search
CPC .......... H01B 3/00; H01B 3/306; H01B 3/421; H01B 2/145
See application file for complete search history.

(56) References Cited

U.S. PATENT DOCUMENTS 2,688,649 A   9/1954   Bjorksten
2,764,505 A   9/1956   Kilbourne, Jr.
(Continued)

FOREIGN PATENT DOCUMENTS

EP   1244164        9/2002
WO   WO2006/064344  6/2006
(Continued)

OTHER PUBLICATIONS

Invitation to Pay Additional Fees, including Partial International Search Report dated Mar. 6, 2015, for International Application No. PCT/US2014/065573; Applicant: RR Donnelley & Sons Company (7 pages).

(Continued)

*Primary Examiner* — Tahseen Khan
(74) *Attorney, Agent, or Firm* — McCracken & Gillen LLC

(57) ABSTRACT

An electrical insulator material includes a polymer and a solvent, and has a viscosity in the range of from about 1.0 to about 20.0 cP such that the electrical insulator material can be applied to a surface using an ink jet print head.

22 Claims, 22 Drawing Sheets

Related U.S. Application Data filed on Nov. 13, 2013, provisional application No. 61/903,819, filed on Nov. 13, 2013, provisional application No. 61/905,697, filed on Nov. 18, 2013, provisional application No. 61/903,846, filed on Nov. 13, 2013, provisional application No. 61/903,859, filed on Nov. 13, 2013.

(51) Int. Cl.

| | | |
|---|---|---|
| *B05B 15/60* | (2018.01) | |
| *H01M 4/04* | (2006.01) | |
| *H01M 4/08* | (2006.01) | |
| *H01M 4/12* | (2006.01) | |
| *H01M 4/1395* | (2010.01) | |
| *H01M 4/38* | (2006.01) | |
| *H01M 10/0565* | (2010.01) | |
| *H01M 6/18* | (2006.01) | |
| *H01M 6/40* | (2006.01) | |
| *B32B 37/12* | (2006.01) | |
| *C08K 5/01* | (2006.01) | |
| *C09J 5/00* | (2006.01) | |
| *C09J 5/06* | (2006.01) | |
| *C09J 131/04* | (2006.01) | |
| *H01B 3/30* | (2006.01) | |
| *H01B 3/42* | (2006.01) | |
| *H01M 2/14* | (2006.01) | |
| *H01M 10/04* | (2006.01) | |
| *H01M 4/131* | (2010.01) | |
| *H01M 4/133* | (2010.01) | |
| *H01M 4/134* | (2010.01) | |
| *H01M 4/36* | (2006.01) | |
| *H01M 4/62* | (2006.01) | |
| *H01M 10/0525* | (2010.01) | |
| *B05B 1/02* | (2006.01) | |
| *H01B 3/44* | (2006.01) | |
| *C09D 11/10* | (2014.01) | |
| *C09D 11/106* | (2014.01) | |
| *C09D 11/324* | (2014.01) | |
| *C09D 11/36* | (2014.01) | |
| *C09D 11/38* | (2014.01) | |
| *C09D 11/52* | (2014.01) | |
| *H01M 4/1391* | (2010.01) | |
| *H01M 4/505* | (2010.01) | |
| *H01M 10/052* | (2010.01) | |
| *H01M 10/0583* | (2010.01) | |
| *H01M 4/02* | (2006.01) | |

(52) U.S. Cl.
CPC ............ *B32B 37/1284* (2013.01); *C08K 5/01* (2013.01); *C09D 11/10* (2013.01); *C09D 11/106* (2013.01); *C09D 11/324* (2013.01); *C09D 11/36* (2013.01); *C09D 11/38* (2013.01); *C09D 11/52* (2013.01); *C09J 5/00* (2013.01); *C09J 5/06* (2013.01); *C09J 131/04* (2013.01); *H01B 3/00* (2013.01); *H01B 3/306* (2013.01); *H01B 3/421* (2013.01); *H01B 3/441* (2013.01); *H01B 3/447* (2013.01); *H01M 2/145* (2013.01); *H01M 4/0402* (2013.01); *H01M 4/0404* (2013.01); *H01M 4/0411* (2013.01); *H01M 4/0414* (2013.01); *H01M 4/0419* (2013.01); *H01M 4/0435* (2013.01); *H01M 4/08* (2013.01); *H01M 4/12* (2013.01); *H01M 4/131* (2013.01); *H01M 4/133* (2013.01); *H01M 4/134* (2013.01); *H01M 4/1395* (2013.01); *H01M 4/364* (2013.01); *H01M 4/382* (2013.01); *H01M 4/622* (2013.01); *H01M 4/625* (2013.01); *H01M 6/181* (2013.01); *H01M 6/188* (2013.01); *H01M 6/40* (2013.01); *H01M 10/0436* (2013.01); *H01M 10/0525* (2013.01); *H01M 10/0565* (2013.01); *H01M 4/1391* (2013.01); *H01M 4/505* (2013.01); *H01M 10/0454* (2013.01); *H01M 10/052* (2013.01); *H01M 10/0583* (2013.01); *H01M 2004/027* (2013.01); *H01M 2300/0082* (2013.01); *Y02E 60/122* (2013.01); *Y02P 70/54* (2015.11); *Y10T 156/10* (2015.01)

(56) References Cited

U.S. PATENT DOCUMENTS

| | | |
|---|---|---|
| 3,725,133 A | 4/1973 | Pollack et al. |
| 3,993,508 A | 11/1976 | Erlichman |
| 4,047,289 A | 9/1977 | Wolff |
| 4,092,464 A | 5/1978 | Dey et al. |
| 4,216,247 A | 8/1980 | Ikeda et al. |
| 4,379,817 A | 4/1983 | Kozawa |
| 4,386,019 A | 5/1983 | Kaun et al. |
| 4,405,699 A | 9/1983 | Kruger |
| 4,466,470 A | 8/1984 | Bruder |
| 4,487,891 A | 12/1984 | Walton et al. |
| 4,502,903 A | 3/1985 | Bruder |
| 4,579,792 A | 4/1986 | Bruder |
| 4,614,026 A | 9/1986 | Plasse |
| 5,007,467 A | 4/1991 | Nelles |
| 5,154,784 A | 10/1992 | Bennett |
| 5,423,110 A | 6/1995 | Gauthier et al. |
| 5,523,110 A | 6/1996 | Mandralis et al. |
| 5,540,742 A | 7/1996 | Sangyoji et al. |
| 5,542,163 A | 8/1996 | Chang |
| 5,624,468 A | 4/1997 | Lake |
| 5,660,948 A | 8/1997 | Barker |
| 5,670,273 A | 9/1997 | Velasquez et al. |
| 5,716,422 A | 2/1998 | Muffoletto et al. |
| 5,746,781 A | 5/1998 | Velasquez et al. |
| 5,747,103 A | 5/1998 | Michell, Jr. et al. |
| 5,824,120 A | 10/1998 | Mitchell et al. |
| 5,837,397 A | 11/1998 | Xing |
| 5,865,860 A | 2/1999 | Delnick |
| 5,888,672 A | 3/1999 | Gustafson et al. |
| 5,895,731 A | 4/1999 | Clingempeel |
| 5,939,223 A | 8/1999 | Cotte et al. |
| 5,989,751 A | 11/1999 | Cotte et al. |
| 6,025,089 A | 2/2000 | Lake |
| 6,030,728 A | 2/2000 | Cotte et al. |
| 6,080,508 A | 6/2000 | Dasgupta et al. |
| 6,294,288 B1 | 9/2001 | Gross |
| 6,308,626 B1 | 10/2001 | Crystal et al. |
| 6,335,114 B1 | 1/2002 | Ueshima et al. |
| 6,352,797 B1 | 3/2002 | Yoshida et al. |
| 6,395,043 B1 | 5/2002 | Shadle et al. |
| 6,413,676 B1 | 7/2002 | Munshi |
| 6,451,480 B1 | 9/2002 | Gustafson et al. |
| 6,500,217 B1 | 12/2002 | Starz et al. |
| 6,524,742 B1 | 2/2003 | Emanuel et al. |
| 6,527,955 B1 | 3/2003 | Sun |
| 6,585,846 B1 | 7/2003 | Hanson et al. |
| 6,632,538 B1 | 10/2003 | Yamazaki et al. |
| 6,761,744 B1 | 7/2004 | Tsukamoto et al. |
| 6,780,208 B2 | 8/2004 | Hopkins et al. |
| 6,815,123 B2 | 11/2004 | Sun |
| 6,854,312 B2 | 2/2005 | Laliberté et al. |
| 6,881,233 B2 | 4/2005 | Cho et al. |
| 6,936,377 B2 | 8/2005 | Wensley et al. |
| 6,996,921 B2 | 2/2006 | Kolb et al. |
| 6,998,193 B2 | 2/2006 | Sun |
| 7,033,698 B2 | 4/2006 | Boczer et al. |
| 7,045,246 B2 | 5/2006 | Simburger et al. |
| 7,105,201 B2 | 9/2006 | Blatter et al. |
| 7,129,005 B2 | 10/2006 | Wensley et al. |
| 7,194,884 B2 | 3/2007 | Laliberté et al. |
| 7,198,870 B2 | 4/2007 | Wensley et al. |

(56) References Cited

U.S. PATENT DOCUMENTS

| | | |
|---|---|---|
| 7,205,072 B2 | 4/2007 | Kang et al. |
| 7,320,845 B2 | 1/2008 | Zucker |
| 7,390,336 B2 | 6/2008 | Vallée et al. |
| 7,544,384 B2 | 6/2009 | Issaev et al. |
| 7,615,084 B2 | 11/2009 | Iijima et al. |
| 7,695,865 B2 | 4/2010 | Saito et al. |
| 7,807,072 B2 | 10/2010 | Choi et al. |
| 7,824,808 B2 | 11/2010 | Vallée et al. |
| 7,887,721 B2 | 2/2011 | Xiao et al. |
| 7,923,400 B2 | 4/2011 | Saito et al. |
| 7,967,214 B2 | 6/2011 | Landau et al. |
| 7,968,233 B2 | 6/2011 | Nelson et al. |
| 8,017,264 B2 | 9/2011 | Hong et al. |
| 8,021,496 B2 | 9/2011 | Yakovleva et al. |
| 8,021,785 B2 | 9/2011 | Wakasugi et al. |
| 8,088,243 B2 | 1/2012 | Wensley et al. |
| 8,114,543 B2 | 2/2012 | Sano et al. |
| 8,137,832 B2 | 3/2012 | Machida |
| 8,153,032 B2 | 4/2012 | Xia et al. |
| 8,163,429 B2 | 4/2012 | Markoski et al. |
| 8,181,879 B2 | 5/2012 | Landau et al. |
| 8,318,358 B2 | 11/2012 | Nelson et al. |
| 8,399,150 B2 | 3/2013 | Miller et al. |
| 8,415,055 B2 | 4/2013 | Choi et al. |
| 8,455,135 B2 | 6/2013 | Yamazaki et al. |
| 8,574,754 B2 | 11/2013 | Tucholski |
| 2002/0110518 A1 | 8/2002 | Okuda et al. |
| 2004/0126655 A1* | 7/2004 | Hisamitsu ............... H01M 2/26 |
| | | 429/162 |
| 2004/0229127 A1 | 11/2004 | Wensley et al. |
| 2004/0253520 A1 | 12/2004 | Wensley et al. |
| 2005/0239917 A1* | 10/2005 | Nelson et al. .............. 523/160 |
| 2006/0147792 A1 | 7/2006 | Nelson et al. |
| 2006/0216609 A1 | 9/2006 | Abe et al. |
| 2006/0251965 A1 | 11/2006 | Nagayama et al. |
| 2006/0257736 A1 | 11/2006 | Watanabe et al. |
| 2007/0072083 A1 | 3/2007 | Ikuta et al. |
| 2007/0099081 A1 | 5/2007 | Matsuda et al. |
| 2008/0105751 A1 | 5/2008 | Landau et al. |
| 2008/0109309 A1 | 5/2008 | Landau et al. |
| 2008/0171149 A1 | 7/2008 | Hastie |
| 2008/0292952 A1 | 11/2008 | Yanagihara et al. |
| 2009/0067119 A1* | 3/2009 | Katayama ............... H01G 9/02 |
| | | 361/523 |
| 2009/0074956 A1 | 3/2009 | Taylor |
| 2009/0098457 A1 | 4/2009 | Kwon et al. |
| 2009/0286150 A1 | 11/2009 | Nelson et al. |
| 2010/0104947 A1 | 4/2010 | Choi et al. |
| 2011/0027636 A1 | 2/2011 | Lee et al. |
| 2011/0111292 A1 | 5/2011 | Kwon et al. |
| 2011/0117417 A1 | 5/2011 | Pitts |
| 2011/0127462 A1 | 6/2011 | Choi et al. |
| 2011/0189528 A1 | 8/2011 | Wu et al. |
| 2012/0028086 A1* | 2/2012 | Shi ......................... H01G 11/52 |
| | | 429/50 |
| 2012/0060360 A1 | 3/2012 | Lin |
| 2012/0129045 A1 | 5/2012 | Gin et al. |
| 2012/0135308 A1 | 5/2012 | Loveridge et al. |
| 2012/0219835 A1 | 8/2012 | Kawabe et al. |
| 2013/0011735 A1 | 1/2013 | Nelson et al. |
| 2013/0011745 A1 | 1/2013 | Johnson et al. |
| 2013/0070391 A1 | 3/2013 | Zheng |
| 2013/0089769 A1 | 4/2013 | Proctor et al. |
| 2013/0171541 A1 | 7/2013 | Sugitani et al. |
| 2013/0177719 A1 | 7/2013 | Tasaka et al. |
| 2013/0216892 A1 | 8/2013 | Matsuura et al. |
| 2013/0244071 A1 | 9/2013 | Lee et al. |
| 2013/0133185 A1 | 12/2013 | Wu et al. |
| 2015/0136301 A1 | 5/2015 | Cyman, Jr. et al. |
| 2015/0140394 A1 | 5/2015 | Cyman, Jr. et al. |
| 2015/0140425 A1 | 5/2015 | Cyman, Jr. et al. |
| 2015/0140442 A1 | 5/2015 | Cyman, Jr. et al. |
| 2015/0333308 A1* | 11/2015 | Toyoda ................. H01M 2/145 |
| | | 429/144 |

FOREIGN PATENT DOCUMENTS

| | | |
|---|---|---|
| WO | WO 2006064344 A2 * | 6/2006 |
| WO | WO 2013151144 A * | 10/2013 |
| WO | WO 2015/073745 | 5/2015 |

OTHER PUBLICATIONS

International Search Report dated Jun. 5, 2015, for International Application No. PCT/US2014/065573, Applicant, R.R. Donnelley & Sons Company (6 pages).

International Written Opinion dated Jun. 5, 2015, for International Application No. PCT/US2014/065573, Applicant, R.R. Donnelley & Sons Company (11 pages).

Non-final Office action dated May 5, 2015, for U.S. Appl. No. 14/541,087, Inventors, Cyman et al. (30 pages).

Non-final Office action dated Jul. 13, 2015, for U.S. Appl. No. 14/541,112, Inventors, Cyman et al. (84 pages).

* cited by examiner

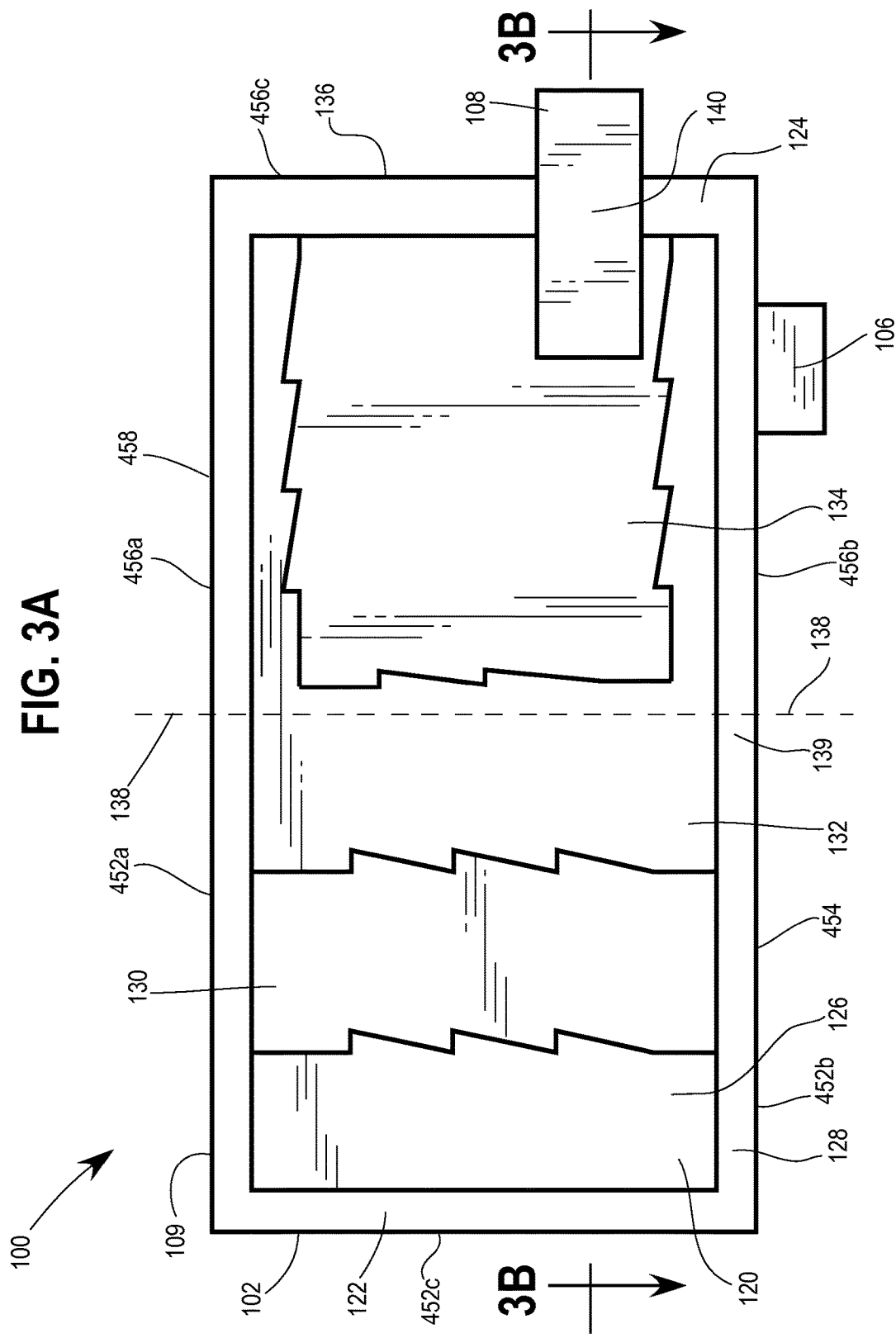

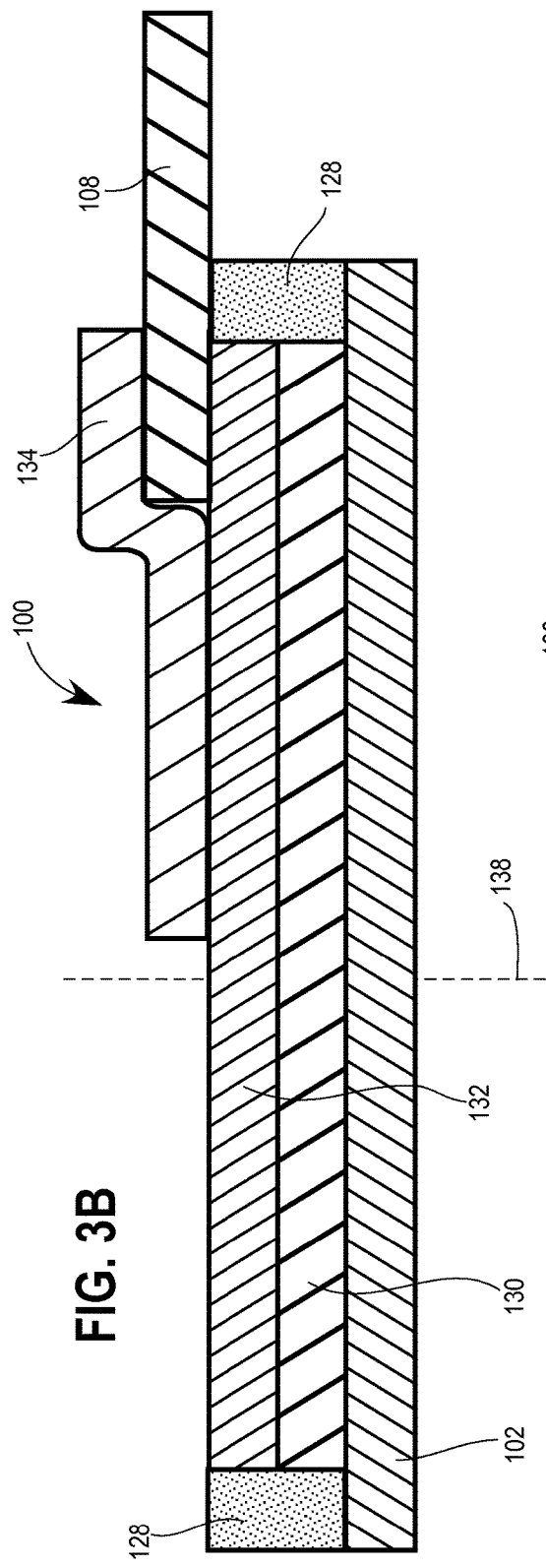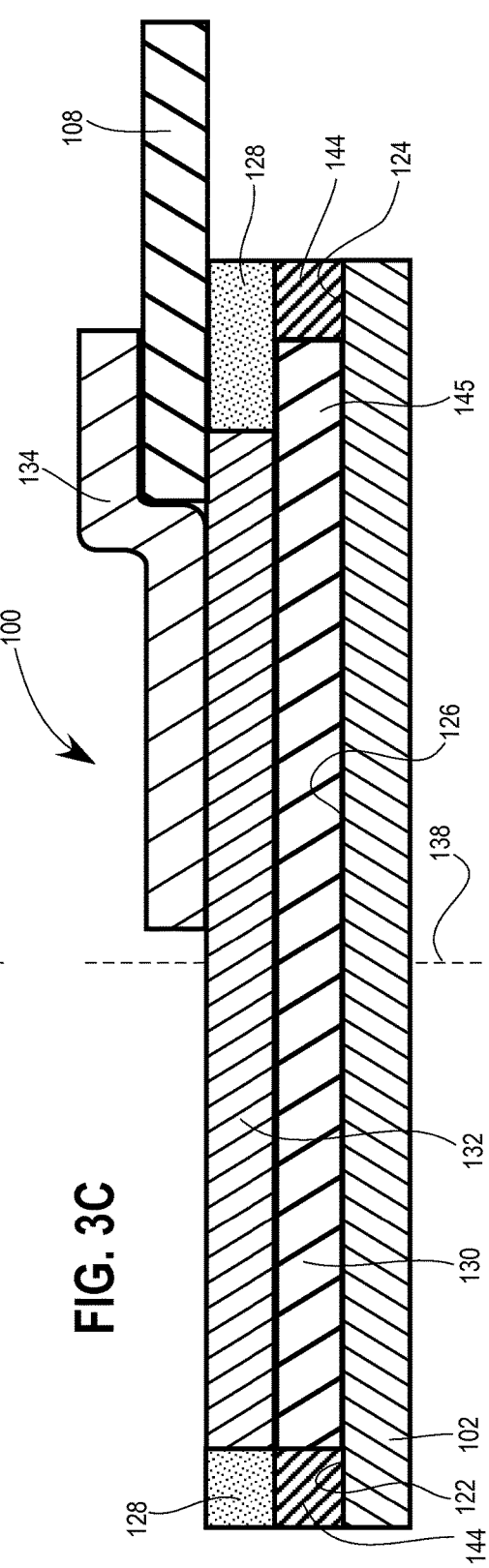

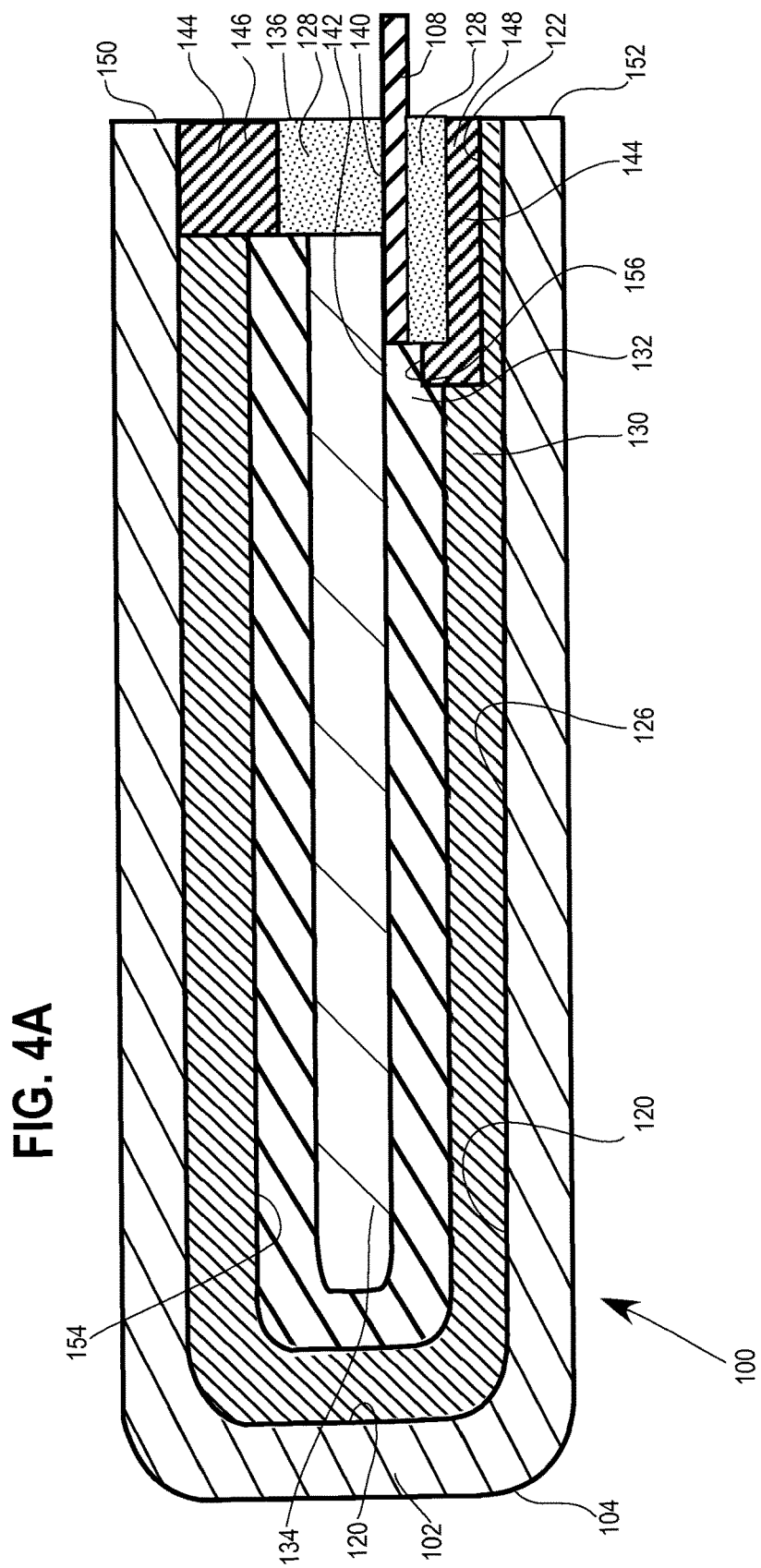

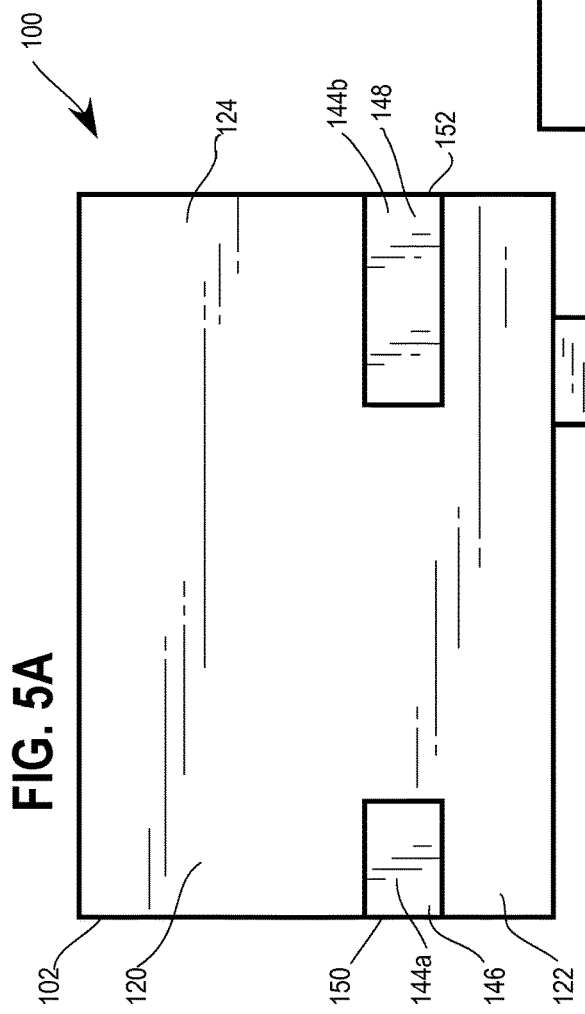
FIG. 5A
FIG. 5B

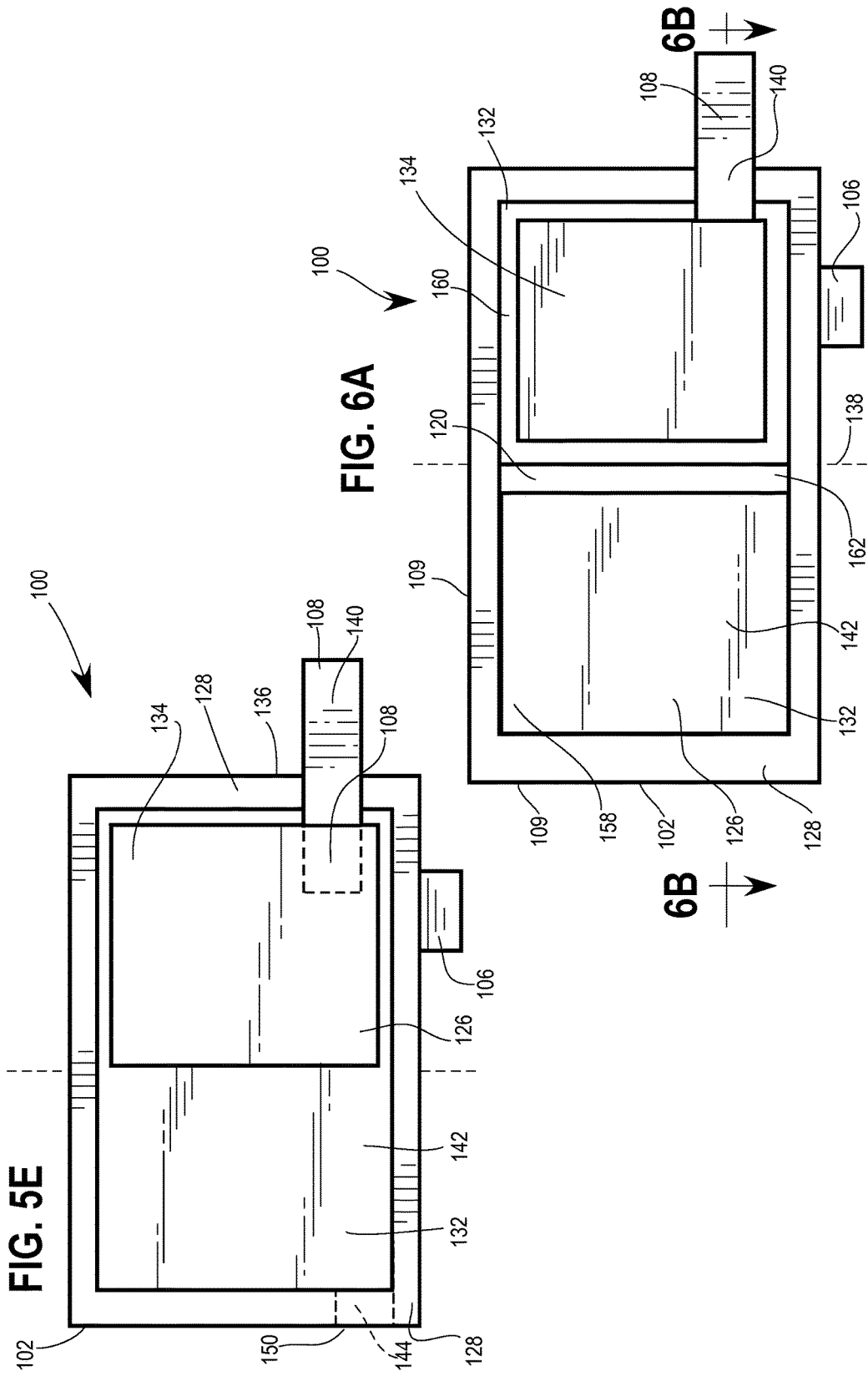

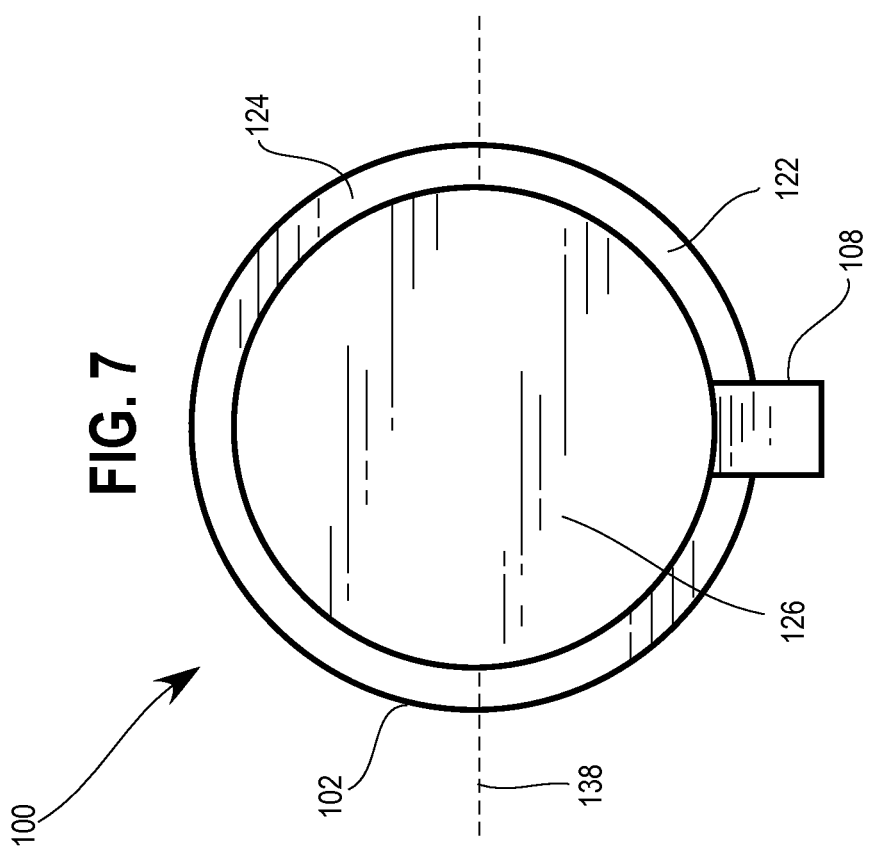

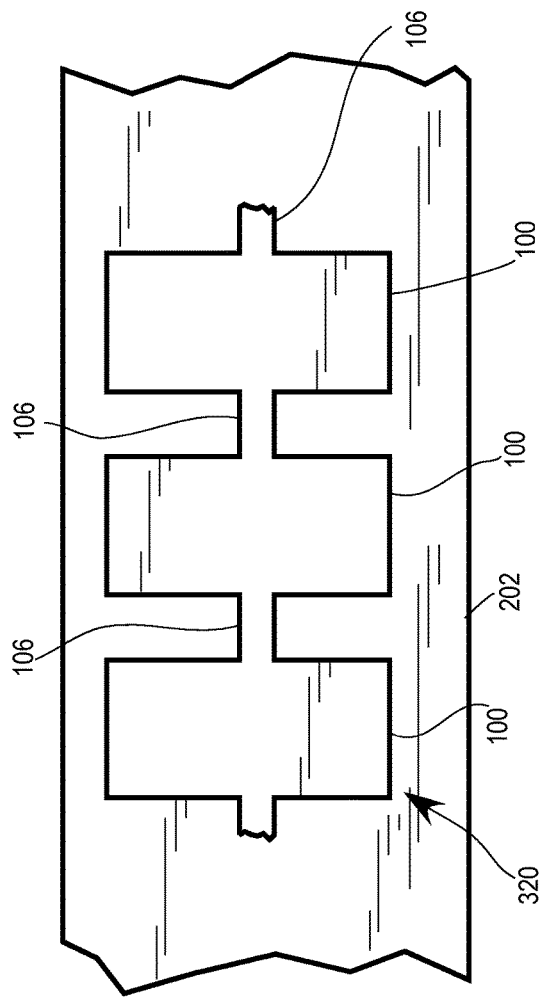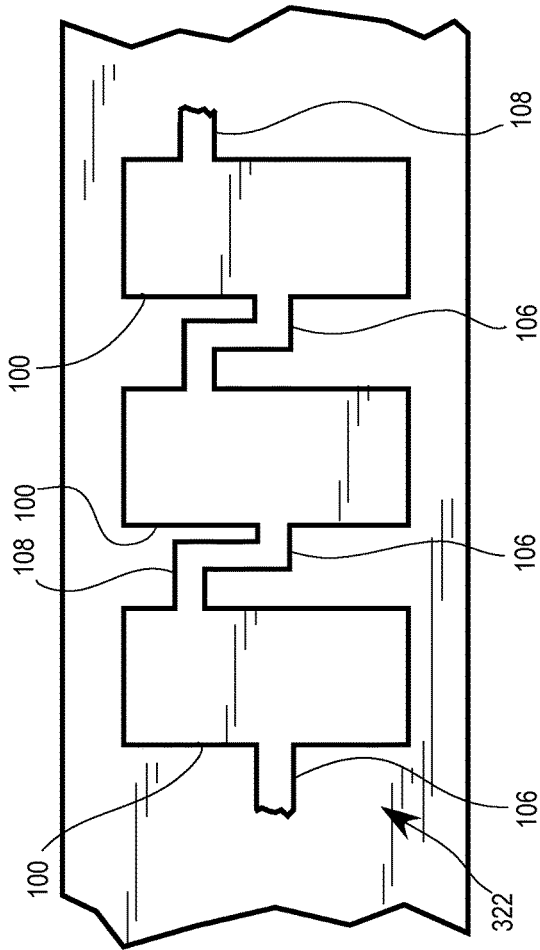

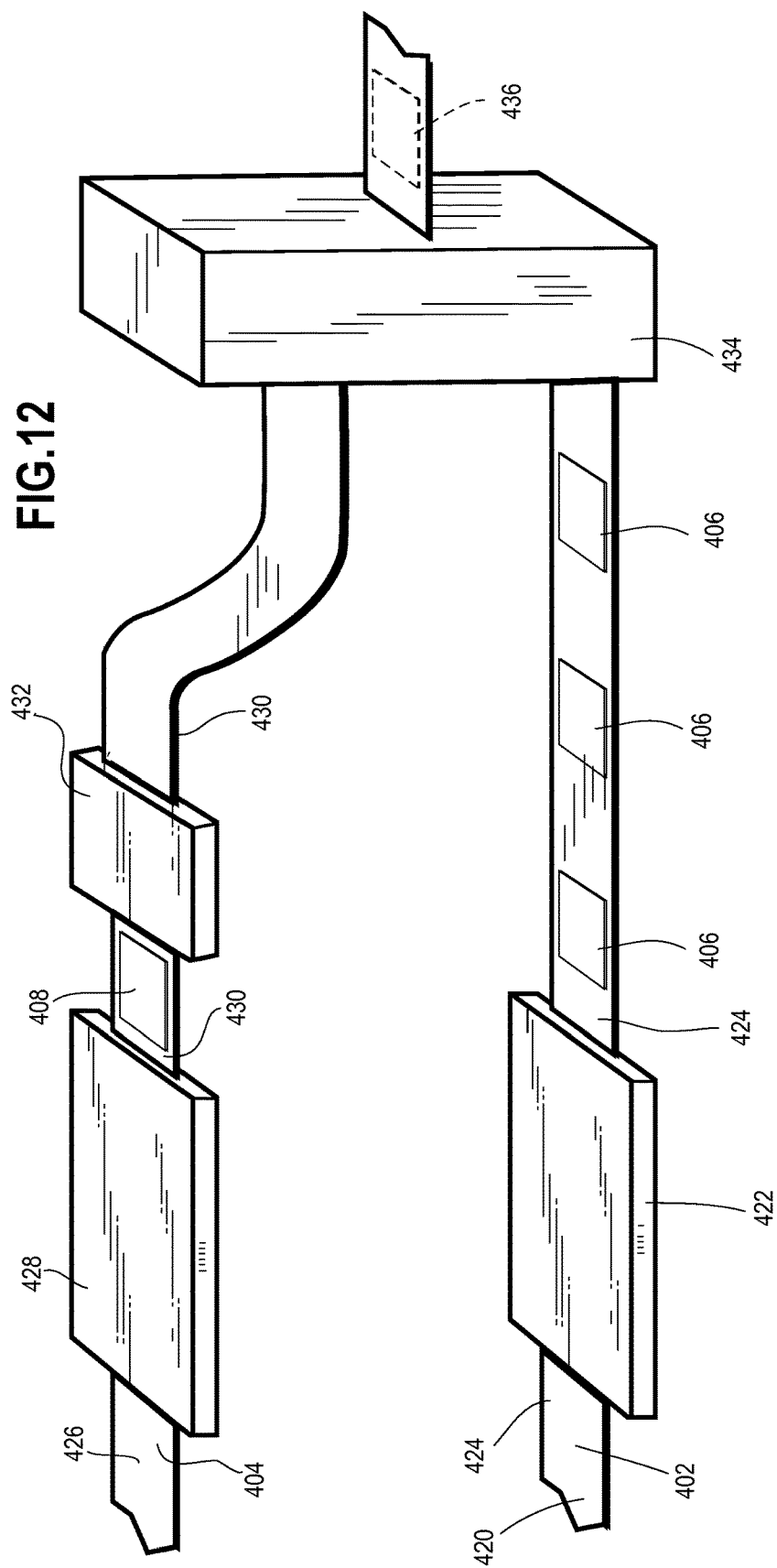

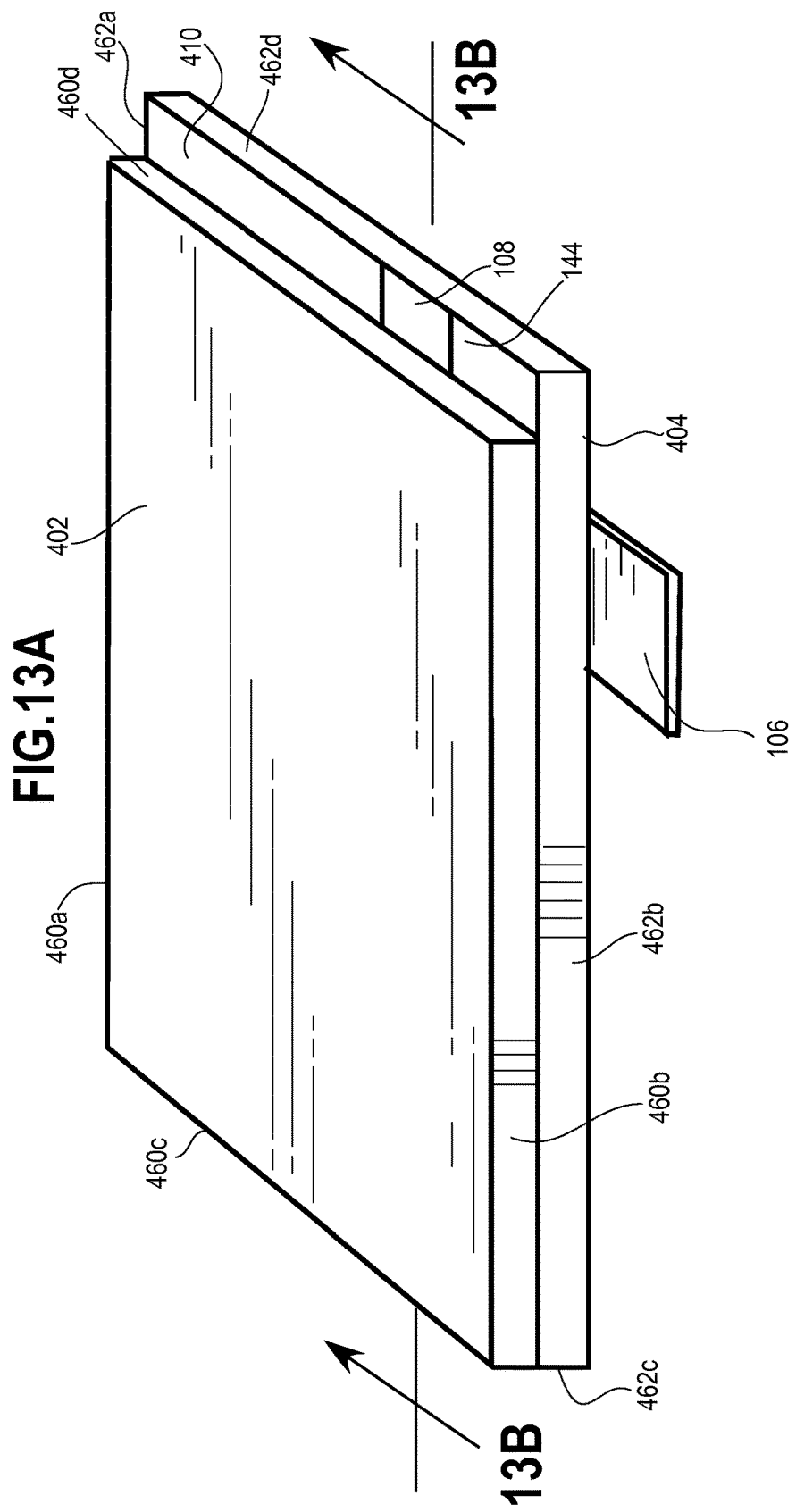

FIG. 15A

ALTERNATIVE CATHODE MATERIAL BALANCE

Ensaco carbon blk. millgrind
ba. size: 600 g

| component | wt. % |
|---|---|
| Ensaco Carbon Blk: | 3.00 |
| disperant (tbd): | 6.00 |
| dry NMP: | 91.00 | amt: 18.00 / 36.00 / 546.00

Ketjen carbon blk. millgrind
ba. size: 600 g

| component | wt. % |
|---|---|
| Ketjen carbon blk.: | 3.00 |
| dispersant (tbd): | 6.00 |
| dry NMP: | 91.00 | amt: 18.00 / 36.00 / 546.00

Timrex graphite millgrind
ba. size: 600 g

| component | wt. % |
|---|---|
| Timrex graphite: | 3.00 |
| disperant (tbd): | 6.00 |
| dry NMP: | 91.00 | amt: 18.00 / 36.00 / 546.00

$MnO_2$ millgrind
ba. size: 600 g

| component | wt. % |
|---|---|
| $MnO_2$ | 25.00 |
| disperant (tbd): | 2.00 |
| dry NMP: | 73.00 | amt: 150.00 / 12.00 / 438.00

5 wt. % GPI-15 polymer sol'n.

| component | wt. % |
|---|---|
| GPI-15: | 5.00 |
| dry NMP: | 95.00 |
| | 100.00 |

| component | amt. |
|---|---|
| LiTFSI: | 1.35 g |
| Surfynol 61: | 1.87 g |
| dry NMP: | 20.17 g |

INSULATOR MATERIAL COMPOSITION AND METHOD

CROSS REFERENCE TO RELATED APPLICATIONS

The present application claims the benefit of U.S. Provisional Patent Application No. 61/903,816, filed Nov. 13, 2013, entitled "Battery"; U.S. Provisional Patent Application No. 61/903,829, filed Nov. 13, 2013, entitled "Adhesive Material Composition and Method"; U.S. Provisional Patent Application No. 61/903,819, filed Nov. 13, 2013, entitled "Insulator Material Composition and Method"; U.S. Provisional Patent Application No. 61/905,697, filed Nov. 18, 2013, entitled "Cathode Material Composition and Methods of Preparing and Applying"; U.S. Provisional Patent Application No. 61/903,846, filed Nov. 13, 2013, entitled "Electrolyte Material Composition and Method"; and U.S. Provisional Patent Application No. 61/903,859, filed Nov. 13, 2013, entitled "Lithium Composition and Methods." The entire contents of all of these applications are incorporated herein by reference.

FIELD OF DISCLOSURE

The present application is directed to a battery, a battery manufacturing system and method, and more particularly to thin-film batteries, and manufacturing systems and methods thereof.

BACKGROUND

Thin-film batteries are used in applications such as smart cards, medical devices, and consumer products. Typically, the thin-film battery includes electrode materials disposed on either side of a separator. Tabs or conductive contacts are coupled to the electrode materials, and the electrode materials and the separator are sealed within an enclosure such that conductive contacts extend beyond the enclosure while the electrode materials and the separator are isolated from the environment outside the battery.

SUMMARY

In one embodiment, an electrical insulator material includes a polymer and a solvent, wherein the electrical insulator material has a viscosity in the range of from about 1.0 to about 20.0 cP such that the electrical insulator material can be applied to a surface using an ink jet print head.

In another embodiment, a method of manufacturing a battery using an ink jet print head comprises the steps of jetting an electrical insulator material comprising a polymer and a solvent onto a surface and vaporizing the solvent. The electrical insulator material has a viscosity in the range of from about 1.0 to about 20.0 cP.

BRIEF DESCRIPTION OF THE DRAWINGS

FIG. 3A is a plan view of the interior of the battery of FIG. 1 shown prior to folding and with portions removed;

FIGS. 3B and 3C are cross-sectional views taken generally along the lines 3B-3B of FIG. 3A illustrating alternative embodiments of the battery of FIG. 1;

FIGS. 4 and 4a are cross-sectional views taken generally along the lines 4-4 of FIG. 1 of another embodiment of the battery of FIG. 1;

FIGS. 5A through 5E are plan views of the interior of the embodiment of FIG. 4 and illustrate application of different components of such embodiment;

FIG. 6A is a plan view of another embodiment of the battery of FIG. 1;

FIG. 7 is a plan view of yet another embodiment of the battery of FIG. 1;

FIG. 8 is a plan view of an embodiment of a multi-cell battery made using the battery of FIG. 1;

FIG. 9 is a plan view of another embodiment of a multi-cell battery made using the battery of FIG. 1;

FIG. 12 is a block diagram of a manufacturing system that may be used to produce the battery of FIG. 10;

FIG. 13A is an isometric view of another embodiment of a battery;

FIGS. 15A and 15B are diagrams of an alternative method of preparing a further embodiment of the cathode material.

DETAILED DESCRIPTION

Figure 1:
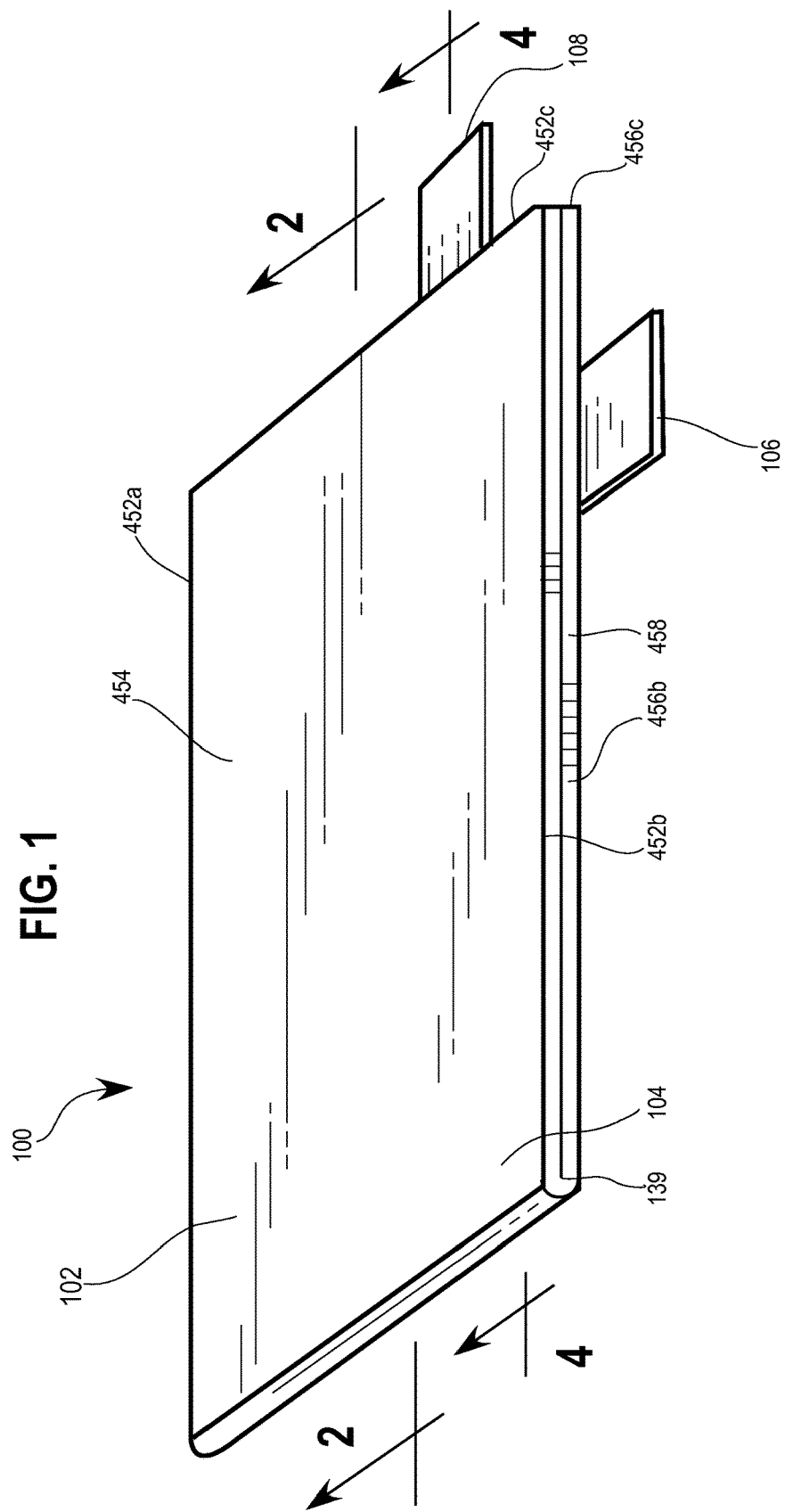
FIG. 1 is an isometric view of a battery according to the present disclosure.

Referring to FIG. 1, a battery 100 includes a substrate 102 that has an outer surface (or face) 104. The battery 100 further includes a cathode tab 106 and an anode tab 108 that may be connected to corresponding connectors of a device to be powered by the battery 100.

Figure 2:
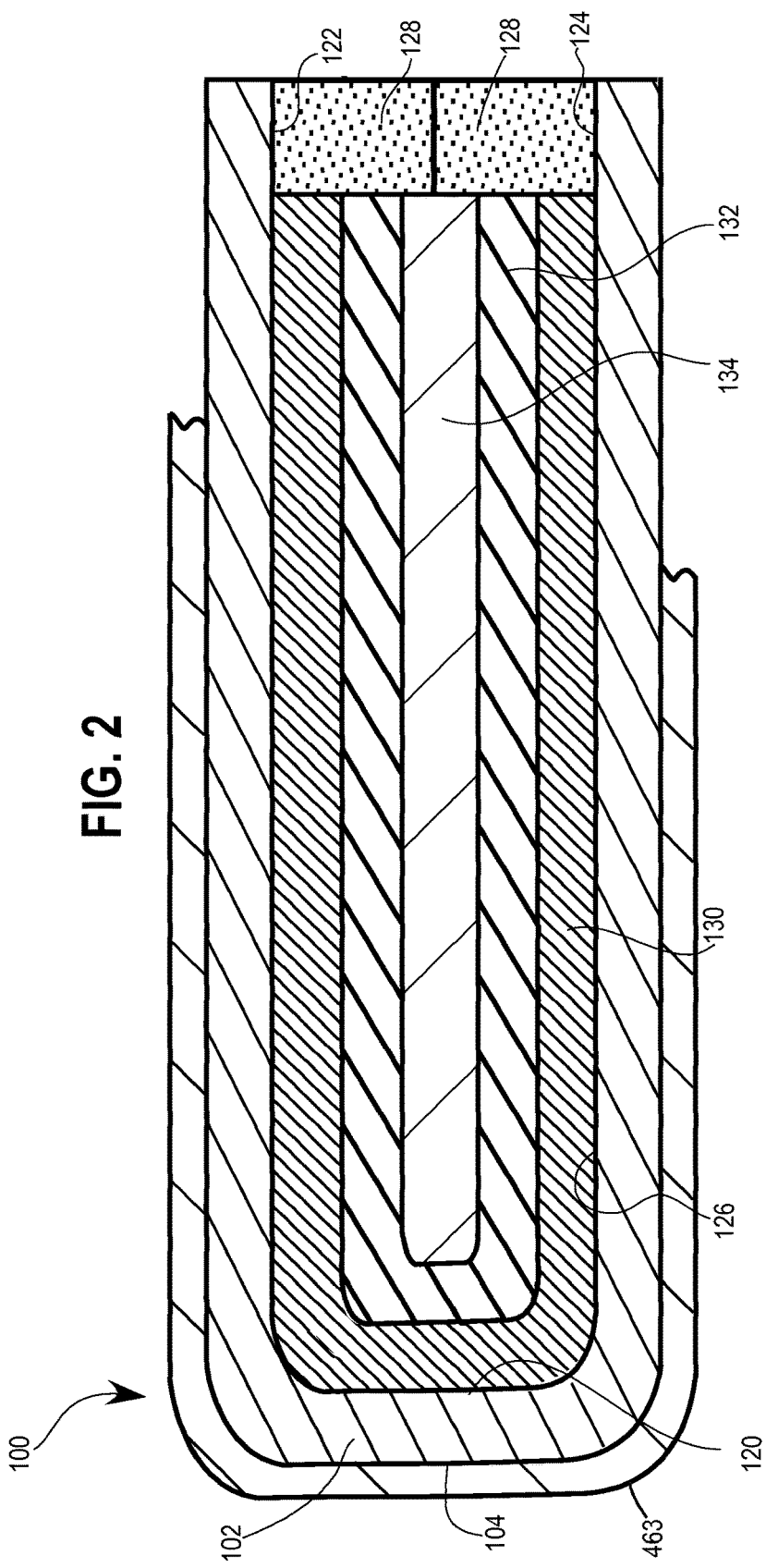
FIG. 2 is a cross-sectional view taken generally along the lines 2-2 of FIG. 1.

Referring to FIGS. 2, 3A, and 3B, an inner surface (or face) 120 opposing the outer surface 104 of the substrate 102 includes an outer perimeter 109 that surrounds a first margin region or portion 122 and a second margin region or portion 124, and an interior region or portion 126. An adhesive material 128 is disposed on the inner surface 120, in at least one or both of the first margin region 122 and the second margin region 124. In some embodiments, the adhesive material 128 is disposed such that at least a portion of the interior region 126 of the inner surface 120 is substantially free of the adhesive material 128.

A layer of cathode material 130 is disposed in the interior region 126 of the inner surface 120. The cathode tab 106 is disposed such that the cathode tab 106 is conductively coupled to the cathode material 130 and extends outwardly beyond the adhesive material 128 deposited on inner surface 120 of the substrate 102.

In some embodiments, the substrate 102 comprises a conductive material and the layer of cathode material 130 is disposed such that the layer of cathode material 130 is conductively coupled to the substrate 102. For some applications, the outer surface 104 of the substrate 102 may be connected to a device powered by the battery 100, and a separate cathode tab 106 may not be necessary. Alternately, the cathode tab 106 may be disposed on the outer surface 104 of the substrate 102 or the inner surface 120 of the substrate 102, or may be integral to the substrate 102. It should be apparent that the cathode tab 106 may be disposed to extend outwardly from any side of the battery 100.

A layer of an electrolyte material 132 is disposed on top of at least a portion of the layer of cathode material 130. A layer of an anode material 134 is disposed on top of at least a portion of the layer of electrolyte material 132. The layer of cathode material 130, layer of electrolyte material 132, and the layer of anode material 134 are disposed such that the layer of electrolyte material 132 conductively separates the layer of cathode material 130 from the anode material 134, yet allows ionic transfer therebetween.

The anode tab 108 is disposed so that the anode tab 108 is conductively coupled with the layer of anode material 134 and extends outwardly beyond a perimeter 136 of the substrate 102. In some embodiments, the anode tab 108 may be disposed between the layer of anode material 134 and the layer of electrolyte material 132 or on top of the layer of anode material 134, or may be integral to the layer of anode material 134.

After the internal components of the battery 100, including the adhesive material 128, the layer of cathode material 130, the layer of electrolyte material 132, and the layer of anode material 134, are disposed as described above, the substrate 102 is folded along a line 138 to define a fold section or portion 139 so that the adhesive material 128 disposed in the first margin region 122 is brought into contact with the adhesive material 128 in the second margin region 124, forming a folded configuration. In some embodiments, a vacuum is generated in the environment surrounding the battery so that any air or other vapors present in the interior of the battery 100 may be evacuated and the adhesive material 128 is activated to seal the battery 100.

Referring to FIG. 3C, in some embodiments of the battery 100, an insulating material 144 is disposed in the first margin region 122 and the second margin region 124. The layer of cathode material 130 is disposed in, at least, the interior region 126 that does not have the insulating material 144 disposed therein. The adhesive material 128 is disposed, at least, on top of the insulating material 144. As shown in FIG. 3C, in some embodiments, the adhesive material 128 may be disposed on top of both the insulating material 144 and a portion 145 of the layer of the cathode material 130. The layer of electrolyte material 132 is disposed on the top of the layer of the cathode material 130. The anode tab 108 is disposed on top of the adhesive material 128. In some embodiments, the anode tab 108 is disposed such that the anode tab 108 is coupled to the electrolyte material 132. The layer of anode material 134 is disposed such that the layer of anode material 134 is coupled to the layer of electrolyte material 132 and the anode tab 108.

Figure 4:
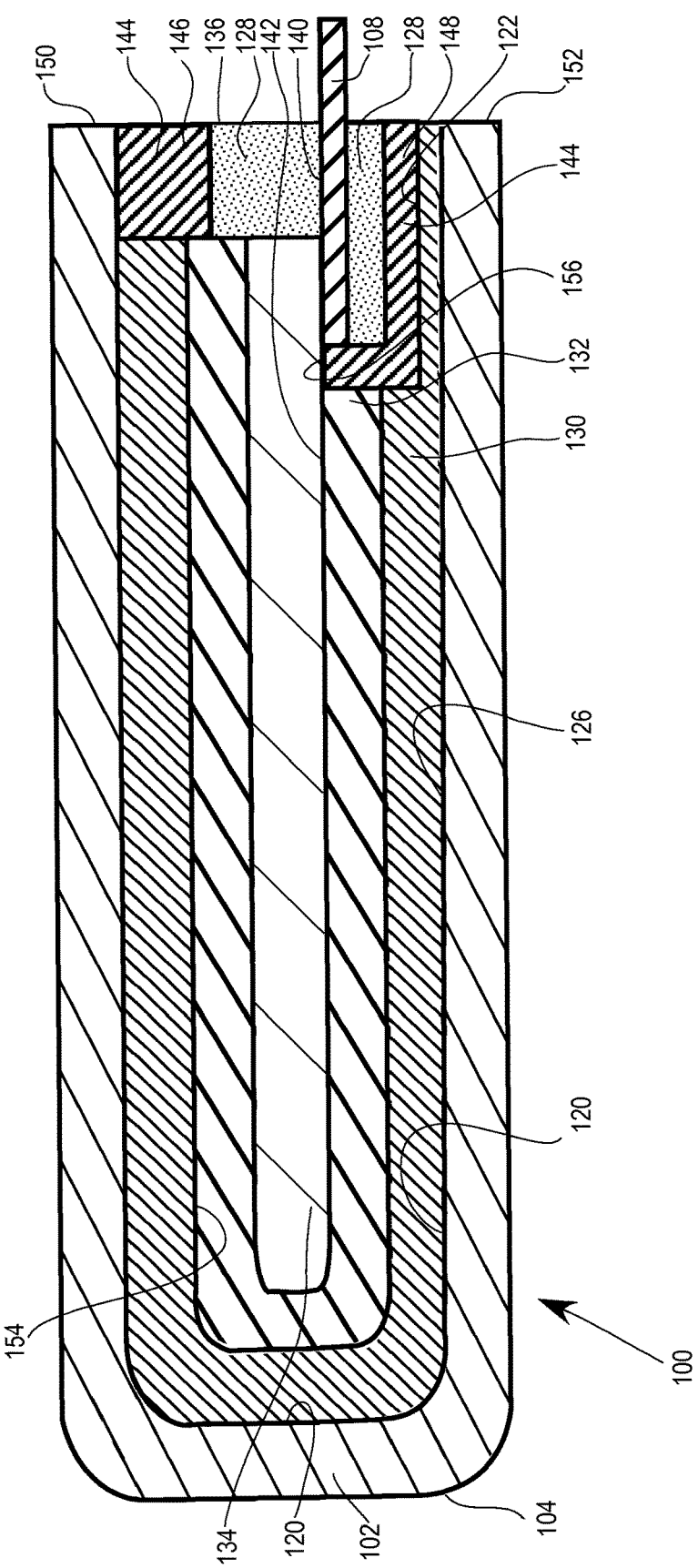

With reference to FIGS. 4 and 4A, in some embodiments, the battery 100 may be constructed to have a substantially flat profile when viewed from the side. Such a flat profile may be achieved by disposing the anode tab 108 into a recess (or notch) in the layer of electrolyte material 132. In such embodiments, the anode tab 108 is disposed so that a top surface 140 of the anode tab 108 is substantially coplanar with a top surface 142 of the layer of electrolyte material 132.

Figure 5D:
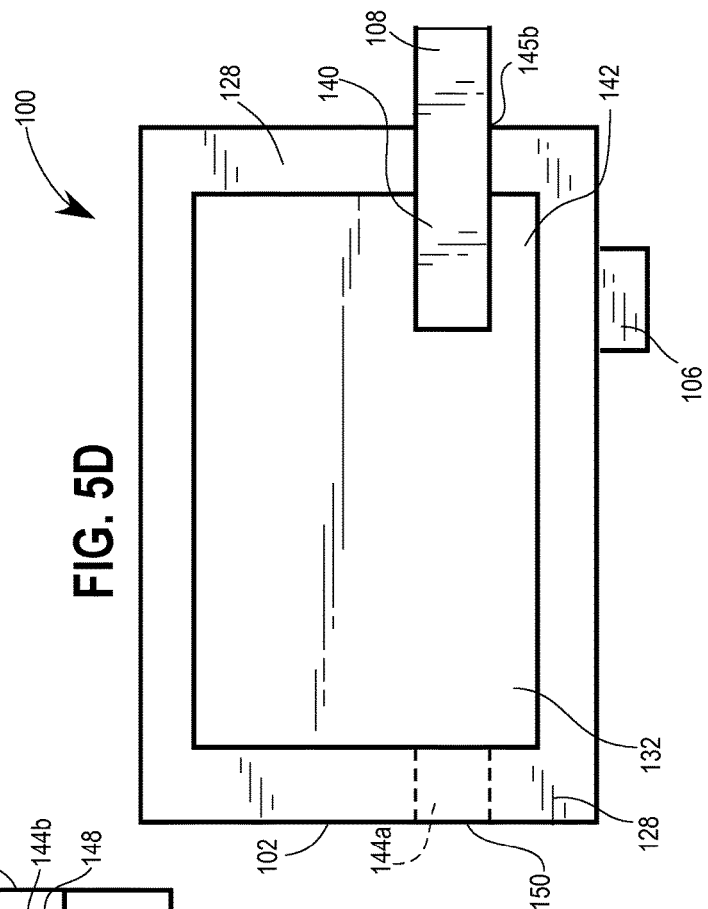

Referring to FIG. 4 and FIGS. 5A-5E, an insulating material 144 is disposed directly or indirectly on inner surface 120 of the substrate 102 (FIG. 5A). A first portion 146 of the insulating material 144a and a second portion 148 of the insulating material 144b are disposed adjacent a first edge 150 and a second edge 152, respectively, of the substrate 102. The insulating material 144 is disposed so that when the anode tab 108 is disposed, the insulating material 144 conductively isolates the disposed anode tab 108 from substrate 120.

The adhesive material 128 is disposed in at least the first margin region 122 and the second margin region 124 of the inner surface 120 (FIG. 5B). In some embodiments, the adhesive material 128 may be disposed to cover a portion of one or both of the first portion 146 and the second portion 148 of the insulating material 144.

Figure 5C:
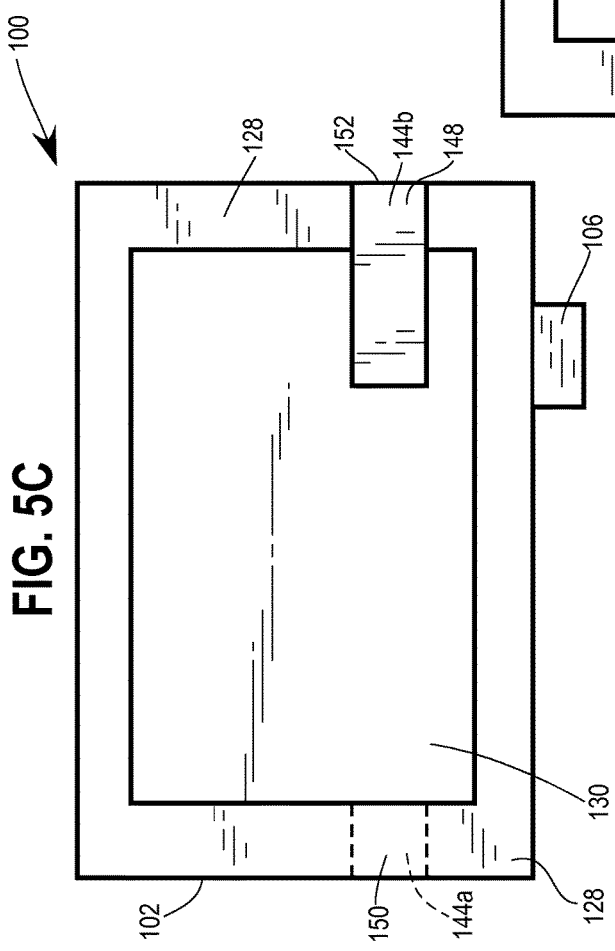

The layer of cathode material 130 is disposed in the interior region 126 of the inner surface 120 (FIG. 5C). The layer of cathode material 130 is disposed so that the second portion 148 of the insulating material 144 is not covered thereby and so that a top surface 154 of the layer of cathode material 130 does not extend outwardly beyond a top surface 156 of the second portion 148 of the insulating material 144.

The layer of electrolyte material 132 is disposed on top of the layer of cathode material 130, and the anode tab 108 is disposed on top of the second portion 148 of the insulating material 144 (FIG. 4). In some embodiments, some electrolyte material 132 (shown in FIG. 4A) may be disposed between the anode tab 108 and the second portion 148 of the insulating material so that the top surface 140 of the anode tab 108 and the top surface of the layer of electrolyte material 132 are substantially coplanar. In some embodiments, the anode tab 108 contacts the adhesive material 128 disposed on top of portions 146 and 148 of the insulating material 144 and such adhesive material 128 facilitates securing the anode tab 108 to the battery 100.

The layer of anode material 134 is disposed in contact with both the layer of electrolyte material 132 and the anode tab 108 (FIG. 5E). Although FIG. 5E shows the anode material 134 disposed on one-half of the interior region 126 of the inner surface 120, it should be apparent that the anode material 134 may be disposed on both halves of the inner surface 120 or disposed to be substantially coextensive with the inner surface 120.

Figure 6B:
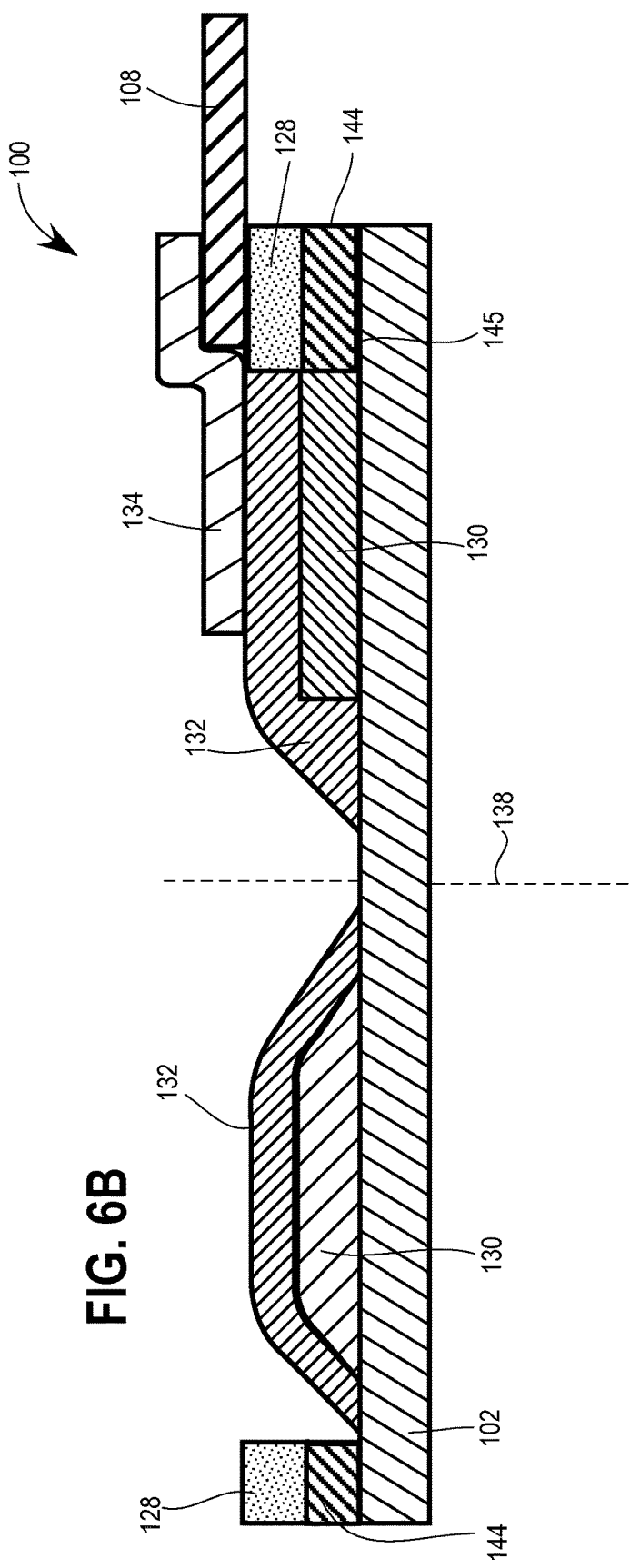
FIG. 6B is a cross-sectional view taken generally along the lines 6B-6B of FIG. 6A.

Referring to FIGS. 6A and 6B, in some embodiments, the layer of cathode material 130 may be disposed on a face of a first half or portion 158 and a face of a second half or portion 160 of the interior region 126 so that there is a gap 162 in the layer of cathode material 130. Similarly, the layer of electrolyte material 132 may be disposed on either side of the gap 162. The layer of anode material 134 may be disposed on only one side of the gap 162 or on either side of the gap 162. As shown in FIGS. 6A and 6B, it should be apparent that the first portion 158 and the second portion 160 are integral substrate portions. The gap 162 formed in this manner may facilitate folding of the battery 100 after the layer of cathode material 130, the layer of electrolyte material 132, and the layer of anode material 134 have been disposed.

The substrate 102 may be copper, nickel coated copper, aluminum, carbon-coated aluminum, or other similar material. In some embodiments the adhesive material 128 may be a heat-activated adhesive or a pressure-activated adhesive, and may be electrically insulative or electrically conductive. In other embodiments, both pressure and heat may be used to activate the adhesive material 128. The layer of anode material 134 may be, for example, lithium or zinc. Other metals or metal compositions may be apparent to those in the art that may be used for the anode material 134. The layer of anode material 134 may be provided as a sheet of material, a powder, and/or a suspension. Appropriate materials that comprise the layer of cathode materials 130 that are compatible for use in a battery with a selected anode material 134 will be apparent to those who have skill in the art. Such materials may include manganese dioxide, titanium dioxide, and lithium dioxide.

Materials appropriate for use for the layer of electrolyte material 132 may include one or more of a semisolid gel, a polymer, and a metal salt (for example, a lithium salt). In one embodiment, the insulating material 144 comprises a polymer based insulating material as described below. Other insulating materials 144 apparent to those who have skill in the art may be used.

In one embodiment, the substrate has a thickness of approximately 22 microns and the cathode material 130 is disposed as a layer that has a thickness of approximately 62 microns. The electrolyte material 132 is disposed as a layer that has a thickness of between approximately 16 and approximately 20 microns. The anode layer 134 may be a piece of lithium that has a thickness of approximately 38 microns. The first portion 146 and the second portion 148 of the insulating material 144 are each disposed as a layer that has a thickness of approximately 22 microns. The anode tab 108 has a thickness of approximately 22 microns.

Various techniques may be used to dispose one or more of materials that comprise the battery 100 described above including coating, lithographic printing, gravure printing, inkjet printing, pulsed laser deposition, magnetron sputtering, chemical vapor deposition, sol-gel processing, or the like. It should be apparent to those who have skill in the art that different printing or other techniques may be used to dispose different materials.

Although a rectangular battery 100 is described above, it should be apparent that other shapes of batteries 100 may be constructed in a substantially identical manner. Referring to FIG. 7, a semicircular battery 100 may be formed by applying the components of the battery 100 described above onto a circular substrate 102, and then folding the circular substrate 102 along the line 138.

Multi-cell batteries may also be manufactured by coupling batteries 100 in parallel or serially. Referring to FIG. 8, a multi-cell battery 320 having greater capacity than an individual battery 100 may be constructed by forming batteries 100 onto a web 202 so that the cathode tabs 106 of the batteries 100 are conductively coupled to one another. Referring to FIG. 9, a multi-cell battery 322 having greater voltage than an individual battery 100 may be constructed by forming batteries 100 onto a web 202 so that the cathode tab 106 of each battery 100 of the multi-cell battery 322 is conductively coupled to the anode tab 108 of another battery 100 of the multi-cell battery 322.

Figure 10:
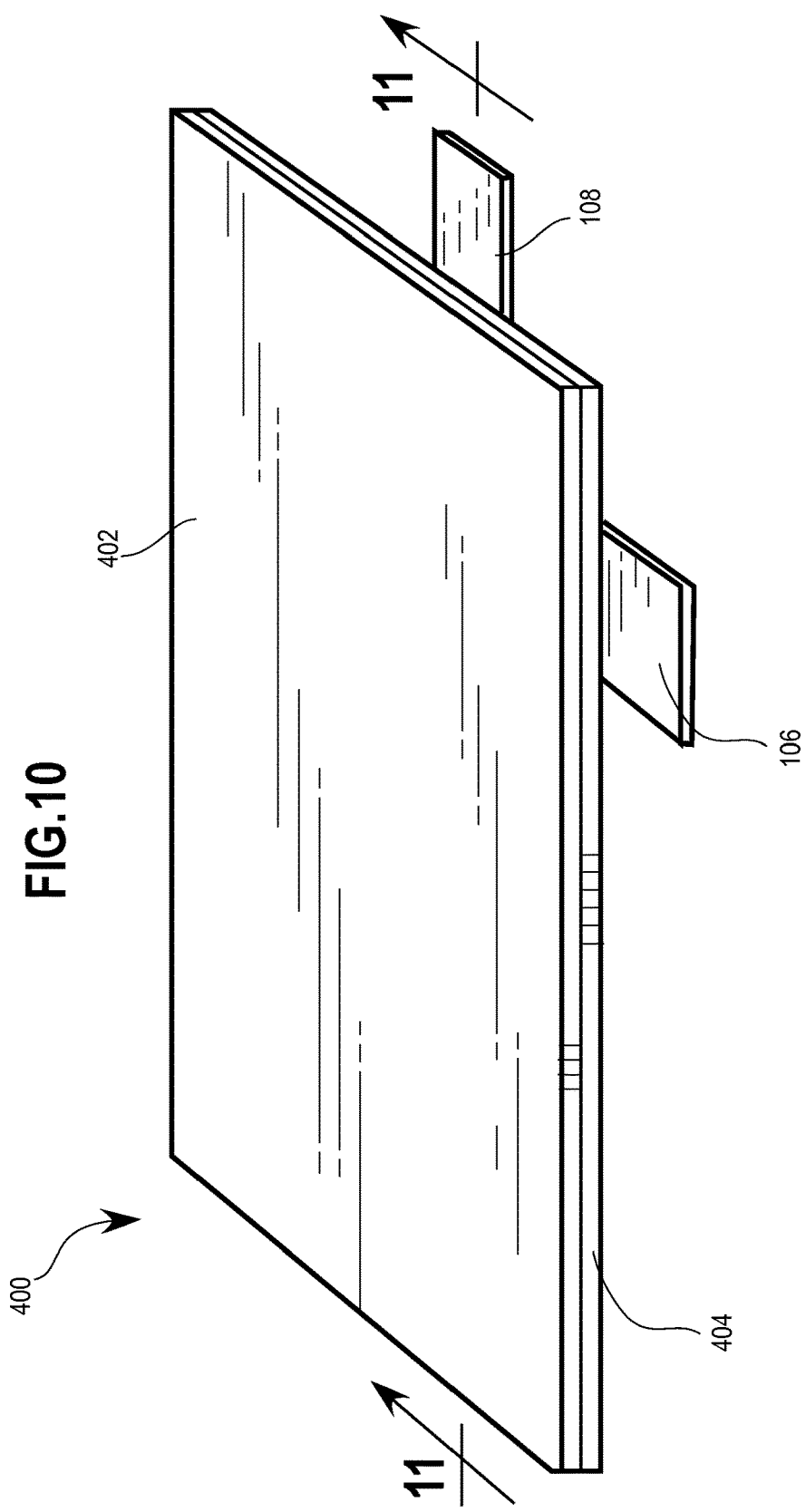
FIG. 10 is an isometric view of another embodiment of a battery.
Figure 11:
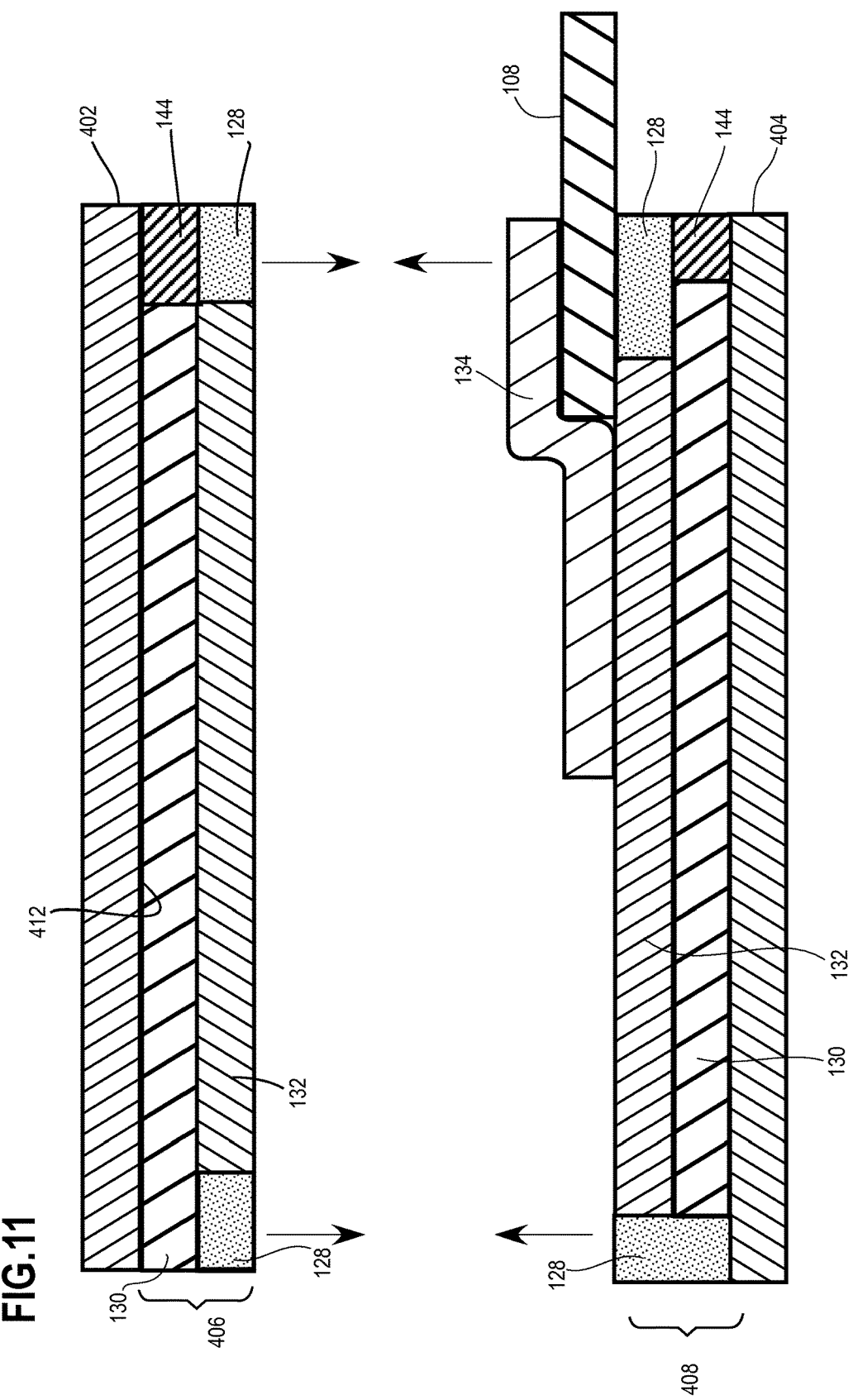
FIG. 11 is a partially exploded, cross-sectional view taken generally along the lines 11-11 of FIG. 10.

Instead of disposing materials onto a substrate 102 and folding the substrate 102 to form the battery 100, materials may be disposed on separate substrate portions that are thereafter laminated together to form the battery 100. Referring to FIGS. 10 and 11, a battery comprises a first conductive substrate portion 402 and a second conductive substrate portion 404. In the illustrated embodiment, the first and second conductive substrate portions 402, 404, respectively, are discrete elements. This is in contrast to the construction of the battery 100 wherein upper and lower portions 454 and 458, respectively, (FIG. 1) of the conductive substrate 102 are integral with one another disposed on the substrate portion 402 are materials 406 that include, for example, a layer of cathode material 130, a layer of electrolyte material insulating material 144, and adhesive material 128, disposed on the substrate portion 404 are materials 408 that include, for example, a layer of cathode material 130, a layer of electrolyte material 132, insulating material 144, adhesive material 128, an anode tab 108, and a layer of anode material 134. The two substrate portions 402 and 404 are brought together so that adhesive material 128 comprising the materials 406 contacts materials 408, and the adhesive material 128 comprising the materials 408 contacts materials 406. The adhesive materials 128 disposed on the substrate portions 402 and 404 are activated to form the battery 400.

Referring to FIG. 12, a web 420 comprising the substrate portion 402 may be passed through a plurality of material applicators 422 that dispose the materials 406 on a side 424 of the web 420.

Similarly, a web 426 comprising the substrate portion 404 may be passed through a plurality of material applicators 428 that dispose the materials 408 on a side 430 of the web 426. A turn unit 432 may be used to turn the web 426 so that the side 430 of the web 426 faces the side 424 of the web 420. A laminating unit 434 aligns the web 420 and be web 426 so that the materials 406 and 408 disposed thereon, respectively, are in register, and laminates at least portions of the web 420 and 426 to form unfinished batteries 436. The unfinished batteries 436 may be processed further to form finished batteries 400 as described above with respect to the manufacture of batteries 100.

Figure 13B:
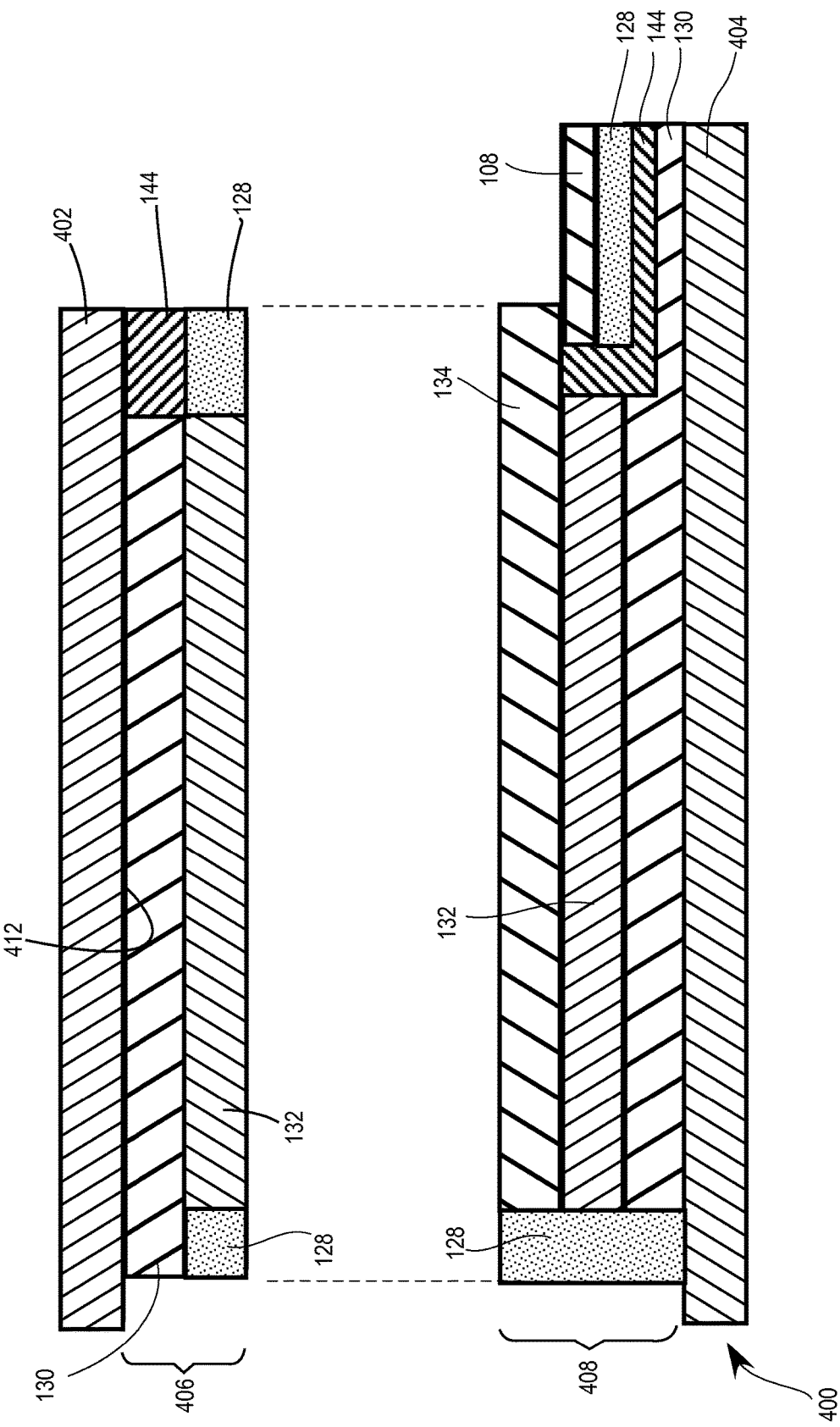
FIG. 13B is a sectional view taken generally along the lines 13B-13B of FIG. 13A.

FIGS. 13A and 13B illustrate an embodiment wherein the anode tab 108 is disposed on an exposed ledge or shoulder 410 of the battery 100 or 400. Specifically, the substrate portion 404 and elements 128, 130, and 144 extend outwardly (i.e., to the right as seen in FIG. 13B) relative to the substrate portion 402 and the elements 144 and 128 in the upper portion of FIG. 13B to define the ledge or shoulder of the battery 100 or 400. In the illustrated embodiment, the adhesive material 128 may be disposed between the insulating material 144 and the anode tab 108. If desired, the insulating material 144 may be omitted, provided the adhesive material 128 is electrically insulating. As seen in FIG. 13A, the insulating material 144 may extend front-to-back by a distance greater than or equal to the extent of the anode tab 108. The battery 100 or 400 having the shoulder 410 may be otherwise identical to the battery of FIGS. 1, 4, and 11. As shown at least in FIG. 13A, at least a portion of the anode tab 108 is exposed outside the battery 100 or 400 so that an electrical load may be coupled thereto.

In some embodiments, the anode tab 108 and/or the insulating material 144 may be applied using any application method as noted above including lithography, gravure, inkjet, vapor deposition, and the like. It should be apparent to one of skill in the art that the anode tab 108 and/or the insulating material 144 may be applied selectively in order to customize the battery 100 or 400. One or more portions of the substrate portions 402 and 404 may be electrically coupled to one another, for example, by crimping, an electrically conductive adhesive such as an epoxy, or otherwise.

The ledge or shoulder 410 may be formed in the battery 100 by folding the substrate about the fold section or portion 139 such that first and second edges 452a and 452b of the upper portion 454 (FIGS. 1 and 3A) align (i.e., are in register with) first and second edges 456a and 456b of the lower portion 458 (the first edge 456a is not visible in FIG. 1). Third edges 452c and 456c are offset with respect to one another (the edges 452c and 456c, while shown in FIG. 1, are not illustrated as being offset in such FIG.). The ledge or shoulder 410 of the battery 400 is formed similarly by aligning first through third edges 460a-460c of the substrate portion 402 with first through third edges 462a-462c, respectively, of the substrate portion 404 and offsetting fourth edges 460d and 462d of the substrate portions 402 and 404, respectively, by making the width of the substrate portion 402 shorter than the width of the substrate portion 404. In some embodiments, only the first and second edges 460a and 460b of the substrate portion 402 may be aligned with first and second edges 462a and 462b, respectively, of the substrate portion 404.

In some embodiments, the battery 100 or 400 described above may be encased in a suitable non-conductive material 463 such as, for example, a plastic or other a polymer, or other materials apparent to those skilled in the art (FIG. 2 shows a portion of the non-conductive material 463 encasing the battery 100). In such embodiments, the battery 100 may be encased after the battery 100 has been folded into the folded configuration, and/or laminated and sealed. The encasing material may seal the entire battery 100 except for portions of the cathode tab 106 and/or anode tab 108, which may be exposed outside of the encasing material, either during the production process or thereafter. In this manner, a load may be electrically coupled to the cathode tab 106 and/or the anode tab 108, but the rest of the battery 100 may be encased to protect such battery from the environment.

One or more techniques other than folding may be used in any of the embodiments disclosed herein to assemble/manufacture battery components. Such techniques include depositing, laying, fusing, adhering, laminating, or otherwise applying materials such as films, coatings, and/or planar, substantially planar, and/or non-planar components atop and/or beside one another either on or without an associated one or more substrates.

Adhesive Material

In one embodiment, the adhesive material 128 of the present application includes a vinyl polymer and a solvent comprising toluene and xylene. Ink jet printing technology may be utilized to apply the adhesive material 128 to a substrate during the manufacture of a battery.

The adhesive material 128 may provide protection of the battery components within the interior region 126 from water and other contaminants in the final battery package. The adhesive material 128 should have sufficient cohesion to resist tearing and delaminating after the battery is laminated. Degradation of the adhesive material 128 could interfere with the electronic and ionic transport and expose the lithium or other anode material to the ambient environment, which could lead to battery failure.

The adhesive material 128 may have flow characteristics to allow for ink jettability. Such flow characteristics may be defined by viscosity, surface tension, or fluid solids content. The viscosity may range from about 1.0 to 20.0 cP, preferably from about 1.0 cP to about 8.8 cP. The surface tension may range from about 25 mN/m to about 45 mN/m, preferably from about 27 mN/m to about 33 mN/m. The fluid solids content (NV) may range from about 0.1% to about 50%, preferably from about 1.5% to about 8.0%. In some embodiments, the adhesive material 128 is jetted from the print head at room temperature. In other embodiments, the print head may be heated up to 65° F. to reduce viscosity. In further embodiments, the adhesive material 128 may be heated prior to delivery to the print head.

In one embodiment, the adhesive material 128 may include from about 1.0% to about 8.0%, preferably from about 2.0% to about 7.0%, and most preferably from about 4.0% to about 5.0%, by weight of the vinyl polymer, and from about 1.0% to about 100.0%, preferably from about 60.0% to about 100.0%, and most preferably from about 85.0% to about 95.0%, by weight of the solvent. Once the adhesive material 128 is applied to the substrate, a majority of the solvent is vaporized such that primarily the vinyl polymer remains. Vaporization includes any material changes to the gaseous state by active means such as heat or other similar processes as well as by passive means such as evaporation or other similar processes. The substrate onto which the adhesive material 128 is jetted may be maintained at an elevated temperature ranging from about 23° C. to about 176° C., preferably about 280° F. (about 138° C.), to promote vaporization of the solvent. The components of the adhesive material 128 are preferably resistant and inert relative to the battery components disposed on the substrate subsequent to the jetting of the adhesive material 128. In particular, the adhesive material 128 may be exposed to n-methyl-2-pyrrolidone (NMP) and gamma butyrolactone (GBL), or similar solvents, and may be relatively inert and unaffected by these solvents such that no degradation, such as softening, discoloration, or dissolution, of the insulator material occurs.

The polymer should have adhesive qualities and be jettable. In one embodiment, a polymer with an average number molecular weight in the range of about 30,000 to about 40,000 g/mol has these properties. One polymer suitable for use may be a terpolymer of ethylene, vinyl acetate, and maleic anhydride, such as Orevac 9305 by Arkema Chemical (King of Prussia, Pa.). Other suitable polymers include polyethylene, ethylene copolymers, copolymers of maleic anhydride, vinyl copolymers, copolymers of ethyl acrylate, ethylene acrylic acid, copolymers of ethylene acrylic acid, ethylene vinyl acetate, thermopolastic urethanes, polyvinylidene fluoride, ethylene acrylate, butyl acrylate, methyl acrylate, polyisobutene, polyolefins, styrene butadiene, copoly rosin, polyterpenes, poly styrenated terpenes, terpene phenolics, to name a few. Monomers that may be suitable for use with other polymers include maleic anhydride, vinyl acetate, and ethyl acrylate, among others.

The solvent may include toluene and/or xylene. In one embodiment, the solvent includes from about 1.0% to about 99.8%, preferably from about 30% to about 70%, and most preferably from about 45% to about 55%, by weight of toluene, and from about 1.0% to about 100.0%, preferably from about 30% to about 70%, and most preferably from about 40% to about 45%, by weight of xylene. Under some circumstances, the ratio of toluene to xylene should range from 1.125:1 to 1.222:1 to improve the vaporization of the solvent.

Other suitable solvents include p-cymene (4-isopropyl toluene) and anisole. In other embodiments, (methoxy benzene), dimethy formamide, cyclohexanone, anisole, n-methyl pyrrolidone, vinyl-pyrrolidone, mestylene (1,3,5-triethylbenzene), methyl ethyl ketone, propylene carbonate, ethylene carbonate, propylene glycol pheny ether, propylene glycol monomethyl ether acetate, dibasic ester, 1-tetradecene, octadecene, limonene and alpha turpineol, or similar compounds may be used.

If the polymer is subjected to a higher heat, for example, during subsequent lamination(s), a further polymer may be included to increase heat resistance and prevent flow at higher temperatures and pressures. In some embodiments, the battery may undergo a lamination at 135° C. for seven minutes at 100 psig and/or a further lamination at 145° C. for six minutes at 100 psig. In some embodiments, the polymer in the adhesive material 128 may have a melting point that is greater than the lamination temperature(s) while simultaneously having a sufficiently low viscosity to allow for jetting. One indicator of heat resistance is the melt index of a polymer, which relates the molecular weight to the flow rate at a particular temperature. An adhesive material 128 that is subjected to lamination may have a combination of polymers having contrasting melt indices. For example, a polymer that has adhesive qualities and is jettable may have a high melt index such as approximately 200 and a melting point such as about 68° C. This polymer may be mixed with a further polymer having a relatively lower melt index such as approximately 7 and a melting point such as about 150° C. to obtain an adhesive material 128 that has adhesive properties, is jettable, and is sufficiently heat resistant.

One suitable heat-resistant polymer is a terpolymer of ethylene, ethyl acrylate, and maleic anhydride such as Lotader 4700 by Arkema Chemical (Kind of Prussia, Pa.). In a sample embodiment, the adhesive material 128 may include from about 0.1% to about 2.7%, preferably 0.5% to about 1.6%, and most preferably from about 0.75% to about 0.9%, by weight of the further polymer. In this sample embodiment, the ratio of the polymer to the further polymer should range from 5.333:1 to 5.556:1 to maintain a good balance of viscosity and heat resistance. Other suitable polymers include those listed above. In other embodiments, a crosslinking agent such as peroxides may be included.

The adhesive material 128 may also include a surfactant to prevent the evaporation of solvents prior to jetting. The adhesive material 128 may include an amount of up to about 10%, preferably between about 0.5% to about 5%, or more preferably between about 0.3% and about 3%, by weight of a surfactant. Any type of surfactant may be useful to include in the adhesive material 128 to impart the desired properties including anionic, nonionic, cationic, or other types of surfactants. One possible surfactant is an octylphenyl ethylene oxide condensate such as Triton X-45 by Dow Chemical (Midland, Mich.). Other suitable surfactants include polyacrylates, fluorine modified acrylates, polysiloxanes, modified ethylene oxides, alkoxylated surfactants, sufosuccinates, acetylenic, alkyl polyglucosides, phosphate esters, and other high surface tension solvents.

In other embodiments, the surface tension modifier is used to reduce spreading. Preferably, dynamic surface tension ranges from about 25 dynes/cm to about 45 dynes/cm. More preferably, a dynamic surface tension ranges from about 29 dynes/cm to about 31 dynes/cm. Static surface tension ranges from about 25 dynes/cm to about 45 dynes/cm, and preferably from about 27 dynes/cm to about 33 dynes/cm. The surface tension modifier may include propylene glycol phenyl ether or dibasic ester, among others.

Additional contemplated components in the adhesive material 128 include a surfactant, a polymer, a leveling agent, an inorganic compound, an organic compound, dielectric particles, dielectric resins, or compounds that may incorporate electrically insulative properties, and/or any combination thereof.

In some embodiments, the adhesive material 128 may be disposed in a layer having a thickness in the range from about 10 microns to about 12 microns. This thickness may be obtained by making a number of passes of the printing unit over the substrate. In some embodiments, the thickness may be obtained by making up to about 50 passes, preferably up to about 30 passes, and more preferably up to about 15 passes of the printing unit over the substrate, although the number of passes depends on various factors such as, for example, selection of the print head type, jetting performance, fluid solids content of the adhesive material 128, and mass flow rate.

The following example further illustrates the disclosure but, of course, should not be construed as in any way limiting its scope. An adhesive material 128 useful in the present disclosure was prepared as follows:

| | |
|---|---|
| 50.8 wt % | Toluene |
| 43.314 wt % | Xylene |

-continued

| | |
|---|---|
| 4.36 wt % | Terpolymer of ethylene, vinyl acetate, and maleic anhydride (Orevac 9305) |
| 0.84 wt % | Terpolymer of ethylene, ethyl acrylate, and maleic anhydride (Lotader 4700) |
| 0.69 wt % | Octylphenyl ethylene oxide condensate (Triton X-45) |

To prepare the adhesive material 128, the toluene and the xylene were heated to approximately 90° on a hot plate fitted with a magnetic stirrer. The polymer and the further polymer were sifted into the heated solvent in small increments with good agitation to prevent settling and gel encasement. Once the resins were in solution the ink was cooled to room temperature and the surfactant was added. The ink was stirred for an additional 15 minutes. Prior to jetting, the adhesive material 128 was filtered.

To evaluate performance, solvent testing, adhesion testing, and moisture testing were conducted on the adhesive material 128. Solvent testing was performed by placing five drops of solvent on a dried film of the adhesive material 128. A watch glass was placed on top of the drops to prevent evaporation. The drops were evaluated at 2 hours and 24 hours for degradation of the adhesive film. Degradation had occurred if the adhesive softened, discolored, or dissolved. During the manufacture of battery packages, the adhesive material 128 was exposed to other solvents at elevated temperatures. No degradation occurred.

Adhesion of the adhesive material 128 to the substrate was determined by tape tests, t-bends, and peel strength testing. The tape test tests the adhesion of the dried ink to the substrate. The adhesive material 128 was coated onto a nickel-coated copper substrate and dried at 100° C. for 15 minutes. A piece of adhesive tape was adhered partially covering the adhesive and partially covering the uncoated nickel-coated copper substrate. The tape was removed quickly at a 150 degree angle. This test was performed on hand draw downs using a Meyer rod to coat the adhesive onto the substrate. The adhesive exhibited excellent adhesion.

T-bends were determined by folding the adhesive coated substrate foil-to-foil and creasing the edge. The crease was then examined using a loupe to determine if any of the adhesive was delaminated.

Peel strength adhesion was then tested using a Tag and Label Manufacturer's Institute (Amityville, Me.). Release and Adhesion tester fitted with grips to hold the battery substrate. A force gage from Mark-10 (Copiague, N.Y.), the M5-10 model, was attached to one of the grips on the adhesion tester to measure peel strength. The battery was attached by placing uncoated ends of the substrate into the grips. The peel tester was set at 12 inches/min. Data was collected using the Mesur-Lite software (Copiague, N.Y.). Acceptable peel strengths were found to be in the 2 lbs force range.

Moisture testing was determined using a spot test. Five drops of solvent were placed on a dried film of the adhesive material 128. A watch glass was placed on top of the drops to prevent evaporation. The drops were evaluated at 2 hours and 24 hours for degradation of the adhesive film. Degradation had occurred if the adhesive softened, discolored, or dissolved. During the manufacture of battery packages, the adhesive material 128 was exposed to other solvents at elevated temperatures. No degradation was detected.

Jetting capability was determined by balancing various solvent combinations for the ability to solubilize the polymer and produce surface tensions, evaporation rates, and viscosities that would be compatible with the Dimatix printhead by Fuji. The boiling points and evaporation rates of the selected solvent combination of xylene and toluene provide a quick drying ink which does not require an additional drying step. The adhesive material 128 is capable of creating a void-free continuous film with good edge definition.

Insulator Material

An insulator material 144 of the present application includes a polymer and a solvent. Ink jet printing technology may be utilized to apply the insulator material 144 to a substrate during the manufacture of a battery.

The insulator material 144 should have sufficient cohesion to resist tearing and delaminating after the battery 100 is laminated. Degradation of the insulator material 144 could interfere with the electronic and ionic transport and expose the lithium or other anode material to the ambient environment, which could lead to battery failure.

The insulator material 144 may have flow characteristics to allow for the insulator material 144 to be properly jetted from the print heads. Such flow characteristics may be defined by viscosity, surface tension, or fluid solids content (NV). The viscosity may range from about 1.0 to 20.0 cP, preferably from about 3.4 cP to about 5.5 cP. The surface tension may range from about 28 to about 45 mN/m. The fluid solids content may range from about 1.0% to about 40.0%, preferably from about 5.0% to about 25.0%, and most preferably from about 15.0% to about 19.0%. In some embodiments, the insulator material 144 is jetted from the print head at room temperature.

In one embodiment, the insulator material 144 may include from about 0.25% to about 20.0%, preferably from about 0.5% to about 6.0%, and most preferably from about 0.75% to about 5.0%, by weight of the polymer, and from about 1.0% to about 99.75%, preferably from about 30.0% to about 99.5%, and most preferably from about 57.0% to about 99.25%, by weight of the solvent. In another embodiment, the insulator material 144 further comprises from about 10.0% to about 70%, preferably from about 20.0% to about 50.0%, and most preferably from about 36.0% to about 40.0%, by weight of a crosslinking agent.

Once the insulator material 144 is applied to the substrate, a majority of the solvent is vaporized such that primarily the polymer remains. Vaporization includes any material changes to the gaseous state by active means such as heat or other similar processes as well as by passive means such as evaporation or other similar processes. The substrate onto which the insulator material 144 is jetted may be maintained at an elevated temperature ranging from about 80° C. to about 300° C. for a duration of about 5 seconds to about 40 minutes, preferably from about 90° C. to about 115° C. for a duration of about 6 minutes to about 8 minutes, to promote vaporization of the solvent. In some embodiments, the substrate may be heated to about 180° F. (about 82° C.) during application of the insulator material 144, and then raised to about 210° F. (about 99° C.) to complete the drying process. The substrate and insulator material 144 may be further heated to promote cross-linking, if applicable. In this case, the substrate and insulator material 144 may be heated at a temperature of from about 80° C. to about 300° C. for a duration of about 2 minutes to about 120 minutes, preferably at a temperature of about 95° C. to about 115° C. for a duration of about 5 minutes to about 10 minutes, and most preferably at a temperature of about 110° C. for a duration of about 6 minutes to about 8 minutes.

In one embodiment, the components of the insulator material 144 may be resistant and inert relative to the battery components disposed on the substrate subsequent to the jetting of the insulator material 144. In particular, the insulator material 144 may be exposed to n-methyl-2-pyrrolidone (NMP) and gamma butyrolactone (GBL), or similar solvents, and may be relatively inert and unaffected by these solvents such that no degradation, such as softening, discoloration, or dissolution, of the insulator material 144 occurs.

The polymer suitable for use may be a linear copolyester, such as Dynapol 912 by Evonik Corp. (Parsippany, N.J.) or a poly(amide imide), such as Torlon 4000T-HV and/or Torlon 4000T-LV by Solvay (Houston, Tex.). Other suitable polymers include polyesters, polyethylene, polycarbonate, polyester-polycarbonate copolymers, epoxies, silicones, polyurethanes, polysilfides, cyanoacrylates, ethylene-propylene diene monomers (EPDM), CE cycloaliphatic epoxy, and parylene(poly(p-xylene)polymers, to name a few. In one embodiment, the insulator material 144 includes from about 1% to about 20%, preferably about 3% to about 5%, and more preferably from about 3.5% to about 4%, by weight of a linear copolyester. In another embodiment, the insulator material 144 includes from about 0.5% to about 10.0%, preferably from about 0.75% to about 5%, and more preferably from about 1% to about 4%, by weight of a poly (amide imide).

The solvent may include NMP, toluene, and/or xylene. In one embodiment, the insulator material 144 includes from about 1.0% to about 99.0%, preferably from about 10.0% to about 50.0%, and most preferably from about 19.0% to about 20.0%, by weight of toluene, and from about 1.0% to about 99.0%, preferably from about 10.0% to about 50.0%, and most preferably from about 19.0% to about 20.0%, by weight of xylene. Under some circumstances, the ratio of toluene to xylene should be approximately 1:1 to improve the vaporization of the solvent. In another embodiment, the insulator material 144 includes from about 1.0% to about 99.75%, preferably from about 30.0% to about 99.5%, and most preferably from about 57.0% to about 99.25%, by weight of NMP.

Other suitable solvents include p-cymene (4-isopropyl toluene), mestylene (1,3,5-triethylbenzene), and anisole (methoxy benzene). In addition, further alternative solvents include dimethy formamide, cyclohexanone, anisole, n-methyl pyrrolidone, vinyl-pyrrolidone, methyl ethyl ketone, propylene carbonate, ethylene carbonate, propylene glycol pheny ether, propylene glycol monomethyl ether acetate, dibasic ester, tetradecene, octadecene, limonene and alpha turpineol, or similar compounds.

In some circumstances, the insulator material 144 may include one or more crosslinking agent(s) to increase heat resistance. In some embodiments, the battery is laminated at 135° F. for seven minutes at 100 psig. In other embodiments, the battery may undergo a second lamination. One suitable crosslinking agent is an isophorone diisocyanate 3,5-dimethylpyrazole such as Trixene BL7960 (Schaumburg, Ill.). Another suitable crosslinking agent is isophorone diisocyanate di-ethyl malonate such as Trixene BL7963 (Schaumburg, Ill.). In a sample embodiment including isophorone diisocyanate 3,5-dimethylpyrazole and isophorone diisocyanate di-ethyl malonate, the ratio of the isophoro isophorone diisocyanate 3,5-dimethylpyrazole to the isophorone diisocyanate di-ethyl malonate should be 1:1 to maintain a good balance of viscosity and heat resistance. Alternative crosslinking agents include polyester polyols, triglycidal isocyanates, melamines, benzoguanamine, n-butylated urea, caprolactam, methyl ethyl ketoxime, di-ethyl malonate, 3,5-dimethylpyrazole, uretidione, isopohorone diisocyanate, 1,6-hexamethylene diisocyanate, and other similar compounds.

The insulator material 144 may include an additional solvent to solubilize the one or more crosslinking agent. One possible solvent is cyclohexanone, although alternatives include toluene, xylene, and the other solvents listed above. Further, a catalyst may be included in the insulator material 144 to initiate cross-linking. One suitable catalyst is the Borchi Kat 315, bismuth neodecanoate by OMG Borchers (Westlake, Ohio). Other possible catalysts include organo zinc complexes, bismuth ncodecanaote, organo zinc complexes, potassium acetate, potassium octoate, bismuth carboxylate, dibutyl tin oxide, aluminum chelates, zirconium chelates, stannous octoate, and dibutyltin dilaurate, among others.

Preferably, dynamic surface tension ranges from about 25 dynes/cm to about 45 dynes/cm. More preferably, a dynamic surface tension ranges from about 29 dynes/cm to about 31 dynes/cm. Static surface tension ranges from about 25 dynes/cm to about 45 dynes/cm, and preferably from about 27.5 dynes/cm to about 29 dynes/cm. The surfactant is an octylphenyl ethylene oxide condensate such as Triton X-45 by Dow Chemical (Midland, Mich.).

Additional contemplated components in the insulator material 144 include a surfactant, a polymer, a leveling agent, an inorganic compound, an organic compound, and/or any combination thereof.

The layer of insulator material 144 may be formed by multiple passes of a print head in order to obtain the desired thickness having sufficient resistance. In some embodiments, the thickness may range from about 20 microns to about 100 microns, preferably about 35 microns to about 45 microns in some embodiments. The electrical resistance should be greater than about 125 megaohms, preferably greater than about 550 megaohms.

The following examples further illustrate the disclosure but, of course, should not be construed as in any way limiting its scope. Insulator materials 144 useful in the present disclosure were prepared as follows:

Example 1

| | |
|---|---|
| 3.85 wt % | Linear copolyester |
| 19.11 wt % | Toluene |
| 19.11 wt % | Xylene |
| 19.89 wt % | Cyclohexanone |
| 19.02 wt % | Isophorone diisocyanate 3,5-dimethylpyrazole |
| 19.02 wt % | Isophorone diisocyanate di-ethyl malonate |

Example 2

| | |
|---|---|
| 2-4 wt % | Linear poly(amide imide) (Torlon 4000T-LV) |
| 96-98 wt % | Solvent (NMP) |

Example 3

| | |
|---|---|
| 1-3 wt % | Linear poly(amide imide) (Torlon 4000T-H) |
| 97-99 wt % | Solvent (NMP) |

To prepare the insulator material 144, the solvent(s) was heated to approximately 90° on a hot plate fitted with a magnetic stirrer. The polymer was sifted into the heated solvent in small increments with good agitation to prevent settling and gel encasement. Once the resins were in solution the ink was cooled to room temperature and the crosslinking agents were added. The ink was stirred for an additional 15 minutes. Prior to jetting, the insulator material 144 was filtered.

To evaluate performance, solvent testing, adhesion testing, moisture testing, and testing of the electrical insulative properties were conducted on the insulator material 144. Solvent testing was performed by placing five drops of solvent on a dried film of the insulator material 144. A watch glass was placed on top of the drops to prevent evaporation. The drops were evaluated at 2 hours and 24 hours for degradation of the insulator film. Degradation had occurred if the insulator softened, discolored, or dissolved. During the manufacture of battery packages, the insulator material 144 was exposed to other solvents at elevated temperatures. No degradation occurred.

Adhesion of the insulator material 144 to the substrate was determined by tape tests and t-bends. For the tape tests, the insulator material 144 was coated onto a nickel-coated copper substrate and dried at 100° C. for 15 minutes. A piece of adhesive tape was adhered partially covering the insulator and partially covering the uncoated nickel-coated copper substrate. The tape was removed quickly at a 150 degree angle. The insulator exhibited excellent adhesion.

T-bends were determined by folding the insulator coated substrate foil-to-foil and creasing the edge. The crease was then examined using a loupe to determine if any of the insulator was delaminated. The insulator appeared continuous and well adhered to the nickel-coated copper substrate Moisture testing was determined using a spot test. Five drops of solvent were placed on a dried film of the insulator material 144. A watch glass was placed on top of the drops to prevent evaporation. The drops were evaluated at 2 hours and 24 hours for degradation of the insulator film. Degradation had occurred if the insulator softened, discolored, or dissolved. During the manufacture of battery packages, the insulator material 144 was exposed to other solvents at elevated temperatures. No degradation was detected.

The electrical insulative properties were determined by coating and curing the insulator on aluminum foil. The electrical resistance was then tested using three methods. The first method utilized the Flue 1507 insulation Tester. The negative probe was clamped onto the bare aluminum and the positive probe was touched to the coated insulator. The insulator had an electrical resistivity up to 550 megaohms at a thickness of 2 to 3 microns. The second method used the Vitrek V61 Tester. The negative probe was clamped onto the bare aluminum and the positive probe was clamped onto the insulator. The sample was tested for five seconds with a current of 3 mA and a voltage of 0.1 kV. Voltage was then raised to 0.5 kV, and the sample was retested. This test passed at 465 megaohms 3. The third test is building a working battery. All the layers of the battery were applied, and the battery was laminated at 110° C. for 3 seconds at 50 PSI (laminator cylinder pressure). The battery was then tested for continuity and passed.

Jetting capability was determined by balancing various solvent combinations for the ability to solubilize the polymer and produce surface tensions, evaporation rates, and viscosities that would be compatible with the Dimatix printhead by Fuji. The boiling points and evaporation rates of the selected solvent combination of xylene and toluene provide a quick drying ink which does not require an additional drying step. The insulator material 144 is capable of creating a void-free continuous film with good edge definition.

Cathode Material

In another embodiment, the cathode material 130 may include an active material, a carbon material, a binder polymer, an ionic salt, a dispersant, and a solvent. Ink jet printing technology may be utilized to apply the cathode material 130 to a substrate during the manufacture of a battery.

The cathode material 130 may have flow characteristics to allow for the cathode material 130 to be properly jetted from the heads. Such flow characteristics may be defined by viscosity, surface tension, fluid solids content (NV), and particle size distributions. The viscosity, in particular at the time of application of the cathode material 130 onto the substrate, may range from about 3.0 to 30.0 cP, preferably from about 3.0 cP to about 20.0 cP. The surface tension may range from about 30 dynes/cm to about 50 dynes/cm. The fluid solids content (NV) may range from about 2.5% to about 25.0%, preferably from about 5.0% to about 15.0%, and most preferably from about 7.5% to about 10.0%. Further, the cathode material 130 may be jetted from the print head at room temperature in some embodiments. In other embodiments, the print head may be heated to about 25° C. to about 55° C., preferably about 43° C.

In addition to the flow characteristics of the materials, the particle size distribution of the dispersed components such as the active material and carbon material(s), may be important to the jettability of the cathode composition. The 95$^{th}$ percentile of the particle size distribution of the materials ranging from about 0.300 microns to about 3.000 microns may preclude the presence of large particles that could clog the ink jet print heads. Additionally, the process for manufacturing the cathode material 130 can be modified to optimize the particle size of the dispersed components. Modifications to the milling process are described in the examples below.

Further, other properties such as resistance and adhesion were considered in evaluating the cathode material 130. The resistance per thickness of the material may be up to about 1.0 ohm/micron, preferably up to about 0.5 ohm/micron. Adhesive failure refers to the separation of the cathode material 130 from the substrate. Cohesive failure refers to the separation of the cathode material 130 from itself.

In one embodiment, the cathode material 130 may include from about 5.0% to about 20.0%, preferably from about 7.0% to about 15.0%, by weight of an active material; from about 0.1% to about 5.0%, preferably from about 0.25% to about 2.5%, by weight of a carbon material; from about 0.25% to about 5.0%, preferably from about 0.5% to about 2.5%, by weight of binder polymer; from about 0.5% to about 5.0%, preferably from about 1.0% to about 3.0%, by weight of an ionic salt; from about 50.0% to about 94.05%, preferably from about 80.0% to about 90.0%, by weight of a solvent or solvent mixture, and from about 0.1% to about 6.0%, preferably from about 0.2% to about 4.0%, by weight of dispersant. The cathode material 130 may also include up to about 6.0%, preferably from about 0.2% to about 4.0%, by weight of surfactant.

Once the cathode material 130 is applied to the substrate, a majority of the solvent may be vaporized. Vaporization includes material changes to the gaseous state by active means such as heat or other similar processes as well as by passive means such as evaporation or other similar processes. The substrate onto which the cathode material 130 is jetted may be maintained at an elevated temperature from about 25° C. to about 200° C., preferably at about 145° C., to promote vaporization of the solvent. The temperature of the print head and/or the substrate may vary depending on the solvent.

The active material suitable for use may be an electrolytic manganese dioxide. Other possible active materials include iron sulfide, iron disulfide, copper iron sulfide, carbon monofluoride, silver chromate, silver oxide plus vanadium pentoxide, copper (III) oxide, copper sulfide, lead bismuthate, bismuth trioxide, vanadium pentoxide, and cobalt oxide, and other similar materials. The particle size distribution is measured using a dynamic laser light scattering apparatus such as a Nanotrac model 252 (Microtrac Corporation, Montgomeryville, Pa.). MV is the mean volume distribution particle size, D50 is the 50$^{th}$ percentile volume distribution particle size, and D95 is the 95$^{th}$ percentile volume distribution particle size. Example particle size distribution results of the active material are shown in Tables 1, 3, and 4. In a sample embodiment, the active material has an average particle size of less than about 0.5 microns and is free of particles greater than 3.0 microns.

TABLE 1

| active material | wt. % | dispersant (s) | wt % | solvent | wt. % | MV | D50 | D95 |
| --- | --- | --- | --- | --- | --- | --- | --- | --- |
| electrolytic MnO$_2$ | 25.0 | BYKJET-9133 | 2.0 | N-methyl-2-pyrrolidinone (NMP) | 73.0 | 0.259 | 0.241 | 0.458 |
| electrolytic MnO$_2$ | 25.0 | BYKJET-9133 | 2.0 | gamma butyrolactone (GBL) | 73.0 | 0.203 | 0.199 | 0.310 |

Carbon material may be added to the cathode material 130 to improve electrical conductivity and ion mobility. Carbon materials are defined as carbon blacks, acetylene blacks, graphites, graphenes, carbon nanotubes, all other structural variation of carbon, and mixtures thereof. In one embodiment, the cathode material 130 includes one or more of the following carbon blacks: Timcal Ensaco 350G, Akzo Nobel Ketjenblack EC-300J, Timcal C-Nergy Super C65, and Evonik Arosperse 7. Other suitable carbon blacks include Timcal C-Nergy Super C45, Timcal Super P-Li, and Denka Japan Denka Black Acetylene black. In some embodiments, the cathode material 130 may include up to about 5.0%, preferably up to about 2.5%, by weight of a graphite. Example particle size distribution results of the carbon materials are shown in Tables 2-4. In a sample embodiment, the carbon material has an average particle size of less than about 0.5 microns and is free of particles greater than 3.0 microns. In some embodiments, it may be desired to maintain a ratio of carbon material to active material between about 1 to 4 and about 1 to 25, preferably between about 1 to 10 and about 1 to 20, more preferably between about 1 to 13 and about 1 to 15.

TABLE 2

| Carbon Material | wt. % | Dispersant (s) | wt % | Solvent | wt. % | MV | D50 | D95 |
|---|---|---|---|---|---|---|---|---|
| Timcal C-Nergy Super C65 carbon black | 6.0 | Solsperse 76400 Solsperse 12000 | 1.8 0.9 | NMP | 91.3 | 0.318 | 0.232 | 0.846 |
| Timcal Ensaco 350G carbon black | 3.0 | polyvinyl pyrrolidinone 15 kMW | 1.5 | NMP | 95.5 | 0.350 | 0.277 | 0.659 |
| Akzo Nobel Ketjenblack EC-300J | 3.0 | polyvinyl pyrrolidinone 15 kMW | 1.5 | NMP | 95.5 | 0.315 | 0.251 | 0.876 |
| Asbury grade 4827 graphite | 3.0 | Solsperse 76400 Solsperse 5000 | 1.5 0.75 | NMP | 94.75 | 0.481 | 0.267 | 2.569 |
| Evonik Arosperse 7 carbon black | 3.0 | Makon 10 | 1.5 | NMP | 95.5 | 0.235 | 0.225 | 0.359 |
| Timcal Ensaco 350G carbon black | 3.0 | Disperbyk-2155 | 2.25 | NMP | 94.75 | 0.297 | 0.270 | 0.540 |
| Akzo Nobel Ketjenblack EC-300J | 3.0 | Disperbyk-2155 | 4.5 | NMP | 92.5 | 0.377 | 0.297 | 0.776 |
| Timcal C-Nergy Super C65 carbon black | 6.0 | Solsperse 76400 Solsperse 12000 | 1.8 0.9 | GBL | 91.3 | 0.309 | 0.284 | 0.590 |
| Evonik Arosperse 7 carbon black | 3.0 | Solsperse 76400 Solsperse 12000 | 0.30 0.15 | GBL | 96.55 | 0.302 | 0.301 | 0.492 |

The binder polymer may provide cohesion and adhesion of the cathode to the conductive substrates. The polymer suitable for use may be a polyimide, such as a terpolymer poly(1,2,4,5-Benzetetracarboxylic dianhydride-co-4,4'-methylene bis(2,6-dimethylaniline)-co-2,4-diaminomesitylene)imide (poly(PDMA+TMMDA/DAMs)imide) by Solicore, Inc. (Lakeland, Fla.), and formed by reacting PMDA, 33.3 mole % DAMs and 66.7 mole % TMMDA. Another suitable polymer is a polyimide such as Matrimid 5218 by Huntsman (Salt Lake City, Utah). Other suitable polymers include a functionalized polyvinylidene fluoride homopolymer such as Kynar ADX by Arkema Chemical (King of Prussia, Pa.), a polyvinylidene fluoride homopolymer such as Kynar HSV 900 by Arkema Chemical (King of Prussia, Pa.), a polyvinylidene fluoride homopolymer such as Kynar 761 by Arkema Chemical (King of Prussia, Pa.), a polyvinyliderte fluoride copolymer such as Kynar 2751 by Arkema Chemical (King of Prussia, Pa.), a polyvinylidene fluoride homopolymer such as Fluor Solef 5130 by Solvay (Houston, Tex.), a polyvinylidene fluoride homopolymer such as KF by Kureha (New York City, N.Y.), a VDF/TFE copolymer such as VT-475 by Daikin (Decatur, Ala.), a poly(vinylidene fluoride-tetrafluoroethylene-propylene) such as Dyneon BRE-7131X by 3M (St. Paul, Minn.), a poly(vinylidene fluoride) such as D-1 by Targray (Montreal, Canada), polyamide-imides, such as such as Torlon 4000T by Solvay (Houston, Tex.), to name a few. Mixtures of polymers may also be employed.

The ionic salt enables ion diffusion to and reaction with the active material. In some circumstances, the ionic salt may be a lithium salt or a lithium salt mixture. In one embodiment, the ionic salt may be lithium bis trifluoromethanesulfonimide (LiTFSI) such as HQ-115 by 3M (St. Paul, Minn.). Other suitable salts such as LiCl, LiBr, LiI, LiPF$_6$, LiClO$_4$, LiB(C$_2$O$_4$)$_2$, LiAsF$_6$, LiBF$_4$, LiN(SO$_2$CF$_2$CF$_3$)$_2$, or LiCF$_3$SO$_3$, may be used. In other embodiments, a lithium salt having a lower metal substrate corrosivity may be used.

The solvent may be N-methyl-pyrrolidone (NMP). Other suitable solvents include gamma butyrolactone, n-gamma valerolactone, N-methyl-2-pyrrolidinone, 3-methyl-oxazolidinone, tetramethylurea, dimethylsulfoxide, dimethylformamide, dimethylacetamide, methylethylketone, methyl isobutyl ketone, ethylene carbonate, propylene carbonate, dimethylcarbonate, ethylmethyl carbonate, diethylcarbonate, dimethoxyethane, dimethoxymethane, diethoxyethane, tetrahydrofuran, 2-methyl-tetrahydrofuran, 1,3-dioxolane, 4-methyl-1,3-dioxolane, 2-methyl-1,3-dioxolane, acetonitrile, methylacetate, ethylacetate, methyl butyrate, ethyl butyrate, or any anhydrous, polar aprotic solvent and mixtures thereof. The evaporation rate of the solvent may range from about 0.01 to about 1.0, preferably from about 0.02 to about 0.1 at 25° C. based on the evaporation rate scale where n-butyl acetate 1.0 at 25° C.

The cathode material 130 may include a dispersant to aid in the reduction of particle size and stabilize the particle size distribution. It may be desirable for the carbon material to have a high surface area, which corresponds to a small particle size, in order to promote electronic conduction. The increased surface area of the active material is desired in some circumstances, as it increases the availability of the material to react with the ionic salt. The high surface area of active material and carbon materials creates a dispersion problem in that the tendency of the particles to recombine, agglomerate, and flocculate is increased with increasing surface area. This can lead to poor jetting performance in and cause settling of the cathode composition prior to jetting. Therefore, in some embodiments, careful selection of the amount and quantity of dispersant to effectively stabilize the dispersed particles in the solvent is undertaken. In one embodiment, the dispersant may be a polyethylene oxide adduct of octyl phenol such as Stepan Makon 10 from Stepan Company or Triton X 100 from Sigma-Aldrich. Another suitable dispersant is a polyvinyl pyrrolidinone having a molecular weight between 5,000 and 20,000 g/mol such as PVP 15K from International Specialty Polymers. Other suitable dispersants are hyperdispersants such as Lubrizol Soisperse 5000, 12000, 41000 or 76400 from Lubrizol Advanced Materials Inc. Other suitable dispersants include polymeric dispersants with pigment affinic groups such as BYKJET-9133, BYKJET-9151, Disperbyk-130, Disperbyk-2050, Disperbyk-2117, Disperbyk-2150, Disperbyk-2155, and Disperbyk-2164 from BYK Chemie, or any nonionic, anionic, cationic, amphoteric dispersant and mixtures thereof suitable for dispersing carbon blacks, graphite, graphene, carbon nanotubes, and inorganic compounds. In one embodiment, the active material may be milled in a dispersion including a dispersant such as BYKJET-9133 or Disperbyk-130. In another embodiment, one or more of the carbon materials may be milled in a dispersion including a dispersant such as Makon 10 by Stepan, Solsperse 5000, 12000, and/or 76400 by Lubrizol, or 15 kMW polyvinyl pyrrolidinone. In some embodiments, the dispersants preferably may not adversely affect adhesion of the cathode layer to the substrate, cohesion of the substrate layer, electrical conductivity and ionic mobility.

The cathode material 130 may include one or more surfactants to improve wetting of the cathode when jetted onto the substrate. Preferably, dynamic surface tension ranges from about 30 dynes/cm to about 50 dynes/cm. Static surface tension ranges from about 30 dynes/cm to about 50 dynes/cm. One suitable surfactant is Surfynol 61 by Air Products. Other potential surfactants include any nonionic, anionic, cationic, amphoteric surfactants and mixtures thereof suitable for controlling liquid surface tension and/or providing for improved wetting of metal substrate surfaces by the cathode composition.

In some embodiments, an adhesion promoting agent may be included to enhance bonding to unprimed metal surfaces.

The layers of the cathode material 130 may be formed by multiple passes of the print head(s) in order to obtain the desired thickness. In some embodiments, the thickness may range from about 40 to about 80 microns, preferably from about 60 microns to about 65 microns. This thickness may be obtained by making up to 120 passes, preferably up to about 100 passes, and more preferably between about 50 passes and 90 passes, of the printing unit over the substrate, although the number of passes is dependent on various factors such as, for example, selection of the print head type, jetting performance, fluid solids content of the cathode material 130, and mass flow rate.

The following examples further illustrate the disclosure but, of course, should not be construed as in any way limiting its scope. It should be noted that the method of preparing the cathode materials 130 may be modified as necessary depending on the size of the batch.

Figure 14A:
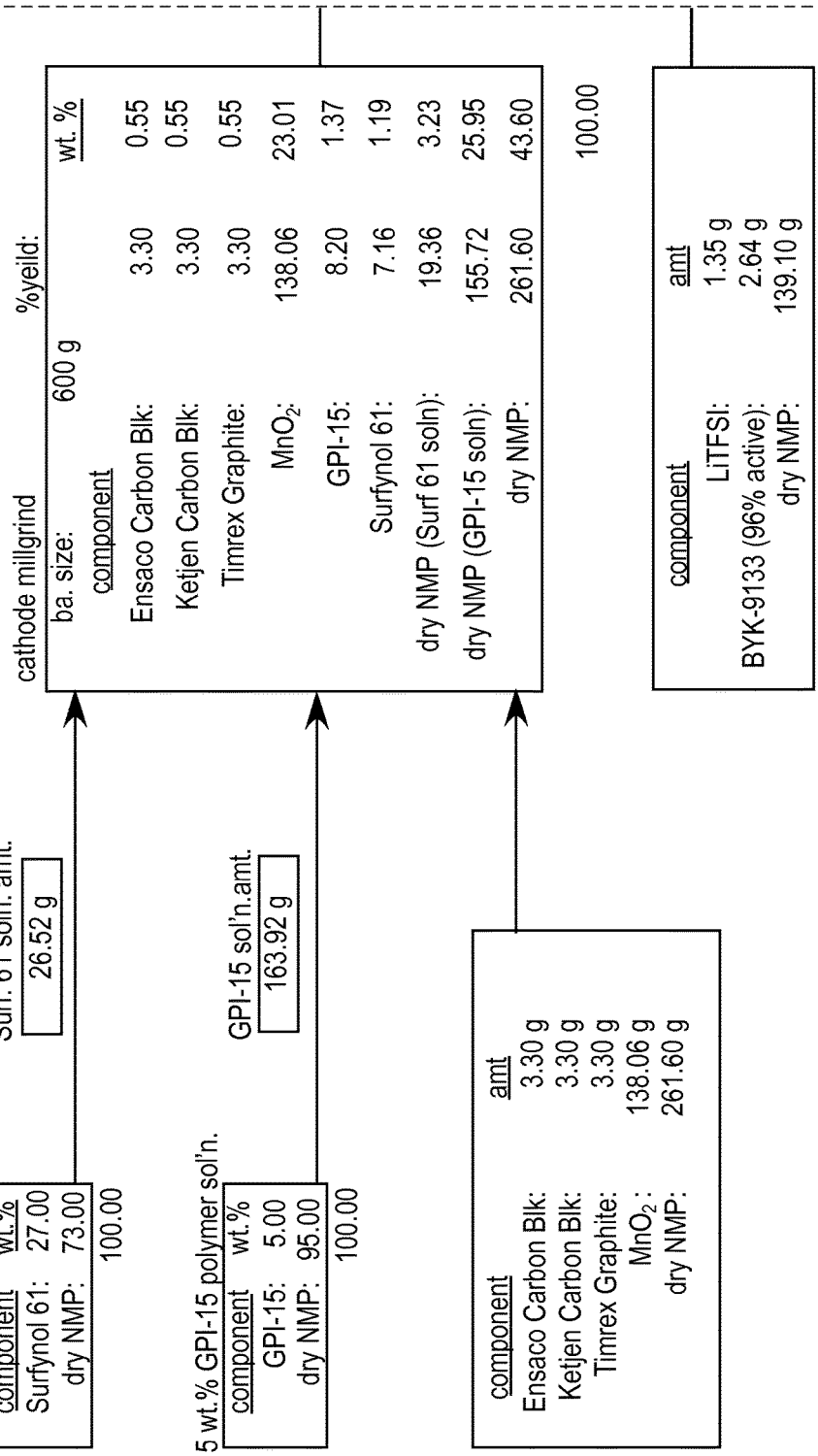
FIGS. 14A and 14B are diagrams of a method of preparing an embodiment of a cathode material.
Figure 14B:
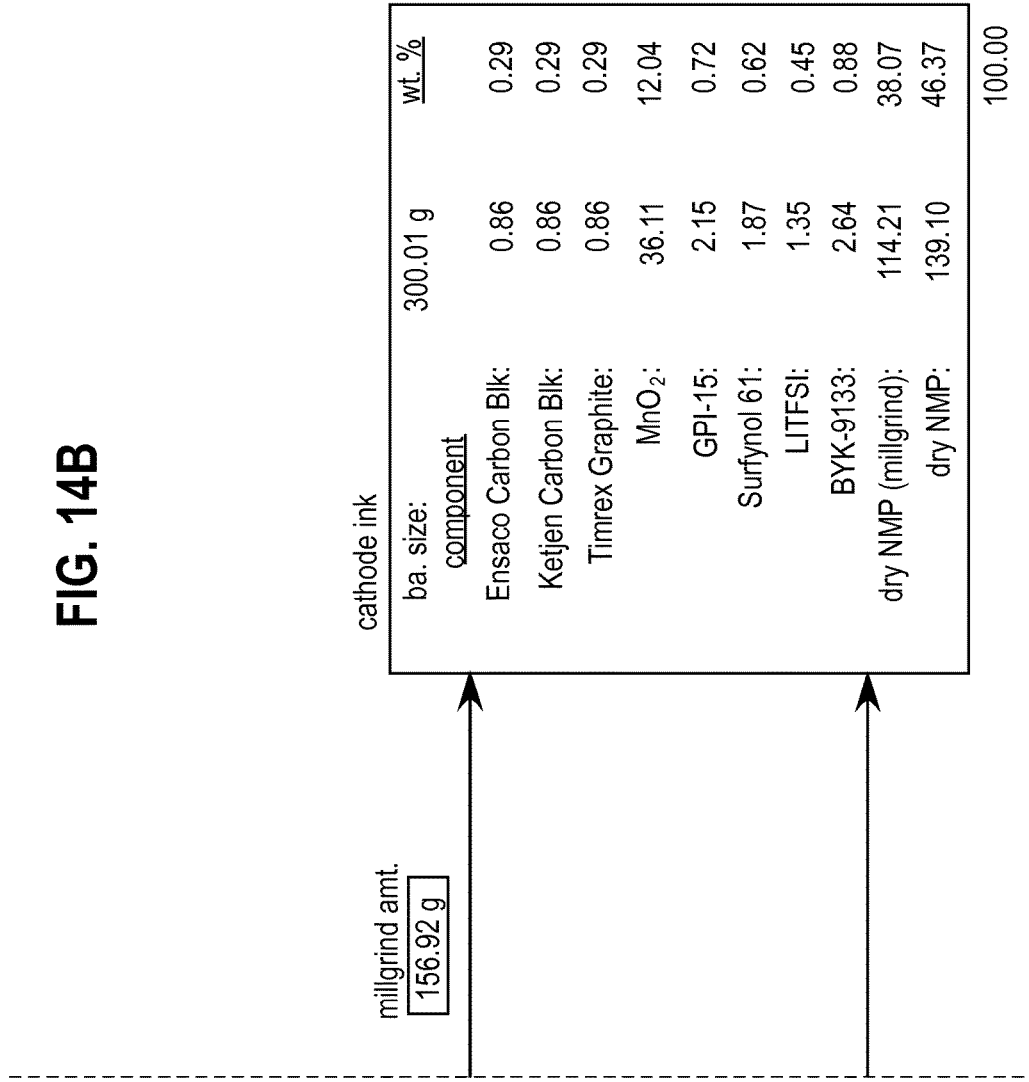

One embodiment of the cathode material 130, Example 1, useful in the present disclosure was prepared in accordance a Process A as shown FIGS. 14A and 14B.

To prepare the cathode material 130, a dispersion of 27% by weight Surfynol 61 was admixed with 73% by weight dry N-methyl-2-pyrrolidinone (NMP) to form a solution having a weight of 26.52 g. A 5% by weight dispersion of the binder polymer was slowly added to 95% by weight NMP dispersion with vigorous stirring for approximately 16 to 24 hours to assure complete dissolution, forming a solution having a weight of 163.92 g. Next, the liquid ingredients were loaded into the cathode millgrind premix. The dry components including 6.6 g of carbon black, 3.3 g of graphite, and 138.06 g of dry beta form manganese dioxide and 261.60 g of NMP were added to the premix with stirring.

The premix was then charged into a stirred media mill by EMI Engineered Mills Inc. loaded with 1 mm yttrium stabilized zirconium beads. Other size beads may be used to optimize the particle size achieved. A temperature control bath connected to the mill maintained the temperature during milling between about 25° C. and about 35° C. During the media milling, particle agglomerates were broken up and a microscopically uniform composition was achieved. The premix was recircuated in the mill at 1000 to 1500 rpm for about 10 minutes to displace air from the system. The cathode millgrind was processed for about 75 minutes at 2700 to 2730 rpm with continuous recycling. As shown in FIGS. 14A and 14B, about 156.92 g of the millgrind was discharged. About 1.35 g of lithium salt, about 2.64 g of the dispersant BYK-9133, and about 139.1 g of dry NMP were then admixed to complete assembly of the cathode components.

Finally, the cathode composition was processed using a high shear rotary homogenizer such as an Omni Mixer or IKA Ultra Turrax for 20 minutes at about 8000 rpm. The cathode material 130 was filtered through a solvent resistant 10 micron nominal membrane filter such as a polypropylene/polyethylene filter by Pall Corp.

The shelf life of the material of Example 1 is approximately 24 hours.

Figure 15B:
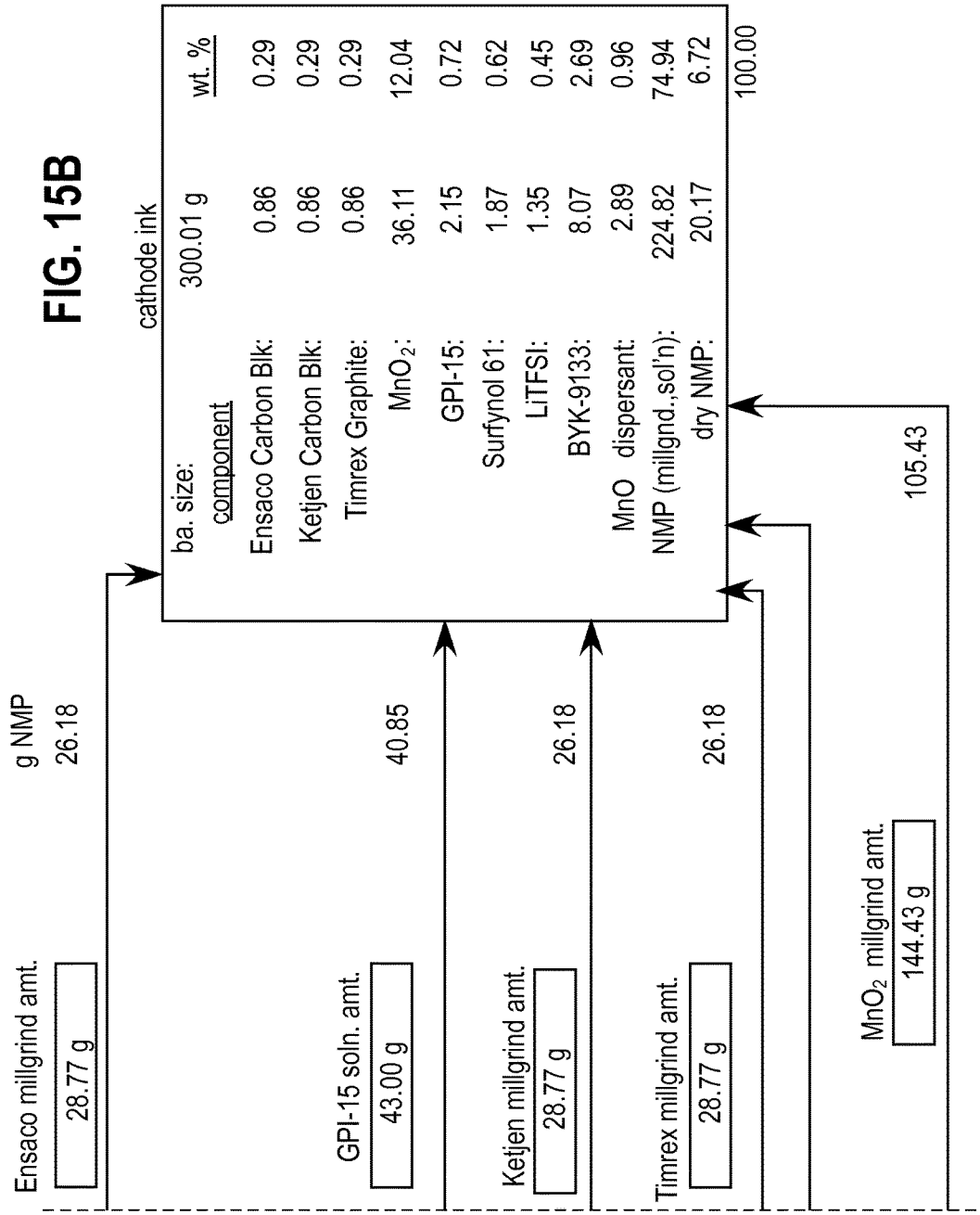

A further embodiment of the cathode material 130, Example 2, useful in the present disclosure was prepared in accordance a Process B as shown in FIGS. 15A and 15B.

The final composition of Example 2 is the same as the final composition of Example 1. The process of manufacturing differs in that the milling processes for each dispersed component including the carbon blacks, graphite, and manganese dioxide, were separated. This separation allowed for selection of an optimum milling aid or dispersant specific for each component, and likewise optimization of the milling process as well as optimization of the final formulation. The average particle sizes are provided in Table 3 below.

TABLE 3

| Component | Average particle size |
|---|---|
| Active material | About 0.100 microns to about 0.500 microns |
| Carbon black | About 0.100 microns to about 0.500 microns |
| Graphite | About 0.200 microns to about 3.000 microns |

In another embodiment, the binder polymer and solvent may be added subsequently to a mixture of the active material, carbon material, and lithium salt components. The active material may have an average particle size in the range from about 0.100 microns to about 0.500 microns, and the carbon black may have an average particle size in the range from about 0.100 microns to about 0.500 microns. In a still further embodiment, the polymer, or a mixture of the polymer and a solvent, may be provided with the mixture of the active material, carbon material, and lithium salt components prior to the addition of the solvent.

Examples 1-7 and Comparative Examples 1 and 2

Details of Examples 1 and 2 described above are provided in Table 4 below. Additionally, Examples 3-7 and Comparative Examples 1 and 4 were prepared in accordance with either process A of FIGS. 14A and 14B, or process B of FIGS. 15A and 15B, as identified in Table 4 below. While each of Examples 1-7 include the general components of carbon black, an active material, a binder polymer, and a solvent, the specific components such as different brands or product lines of each general component of Examples 1-7 vary as shown in Table 4. The details of Examples 1-7 and Comparative Examples 1 and 2 are provided in Table 4.

TABLE 4

| ink ID | process (A or B) | millgrind(s) component | millgrind wt. % ID | MV | D50 | D95 | % > 3 nm | cathode ink component | wt. % | MV | D50 | D95 | % > 3 nm |
|---|---|---|---|---|---|---|---|---|---|---|---|---|---|
| Example 1 KB01-78-INK std. formula & process | A | Carbon black (Ensaco 350G) Carbon black (Ketjen) Graphite (Timrex KS4) MnO₂ poly(PDMA + TMMDA/DAMs)imide Surfynol 61 NMP | 0.55 KB01-78-stnd 0.55 0.55 23.01 1.37 1.19 72.78 | | | | | Carbon black (Ensaco 350G) Carbon black (Ketjen) Graphite (Timrex KS4) MnO₂ poly(PDMA + TMMDA/DAMs)imide Surfynol 61 LiTFSI BYK-9133 NMP | 0.29 0.29 0.29 12.04 0.72 0.62 0.45 0.88 84.43 | 0.954 | 0.404 | 5.93 | 9.78 |
| Example 2 KB01-79-INK | B | Carbon black (Ensaco 350G) polyvinylpyrrolidone 15K MW NMP Carbon black (Ketjen) polyvinylpyrrolidone 15K MW NMP Graphite (Timrex KS4) polyvinylpyrrolidone 15K MW NMP MnO₂ BYK-9133 NMP | 3.00 KB01-75-Ensaco 1.50 KB01-75-Ketjen 95.50 KB01-77-Timrex 3.00 KB01-78-MnO2 1.50 95.50 15.00 7.50 77.50 25.00 2.00 73.00 | 0.350 0.315 3.21 0.374 | 0.277 0.251 3.63 0.334 | 0.659 0.876 6.33 0.722 | 0.00 0.00 48.55 0.00 | Carbon black (Ensaco 350G) Carbon black (Ketjenblack) Graphite (Timrex KS4) MnO₂ poly(PDMA + TMMDA/DAMs)imide polyvinylpyrrolidone 15K MW LiTFSI BYK-9133 NMP | 0.29 0.29 0.29 12.04 0.72 1.32 0.45 0.96 83.64 | 0.435 | 0.406 | 0.679 | 0.00 |
| Example 3 KB01-81-INK | B | Carbon black (Timcal Super C65) Solsperse 76400 Solsperse 12000 NMP MnO₂ BYK-9133 NMP | 6.00 KB01-58-C65-2 1.80 KB01-80-MnO2 0.90 91.30 25.00 2.00 73.00 | 0.373 0.327 | 0.305 0.305 | 0.906 0.551 | 0.00 0.00 | Carbon black (Timcal Super C65) Solsperse 76400 Solsperse 12000 MnO₂ poly(PDMA + TMMDA/DAMs)imide polyvinylpyrrolidone 15K MW LiTFSI BYK-9133 NMP | 0.88 0.26 0.13 12.04 0.72 0.45 0.96 84.56 | 0.448 | 0.368 | 0.713 | 0.00 |
| Example 4 KB01-82-INK | B | Carbon black (Ensaco 350G) polyvinylpyrrolidone 15K MW NMP Carbon black (Ketjen) polyvinylpyrrolidone 15K MW NMP MnO₂ BYK-9133 NMP | 3.00 KB01-75-Ensaco 1.50 KB01-75-Ketjen 95.50 KB01-80-MnO2 3.00 1.50 95.50 25.00 2.00 73.00 | 0.350 0.315 0.327 | 0.277 0.251 0.305 | 0.659 0.876 0.551 | 0.00 0.00 0.00 | Carbon black (Ensaco 350G) Carbon black (Ketjenblack) MnO₂ poly(PDMA + TMMDA/DAMs)imide polyvinylpyrrolidone 15K MW LiTFSI BYK-9133 NMP | 0.44 0.44 12.04 0.72 0.66 0.45 0.96 84.29 | 0.312 | 0.302 | 0.485 | 0.00 |
| Example 5 KB01-83-INK | B | Carbon black (Timcal Super C65) Solsperse 76400 Solsperse 12000 NMP Carbon black (Ensaco 350G) polyvinylpyrrolidone 15K MW NMP MnO₂ | 6.00 KB01-58-C65-2 1.80 KB01-75-Ensaco 0.90 KB01-80-MnO2 91.30 3.00 1.50 95.50 25.00 | 0.373 0.350 0.327 | 0.305 0.277 0.305 | 0.906 0.659 0.551 | 0.00 0.00 0.00 | Carbon black (Timcal Super C65) Carbon black (Ensaco 350G) MnO₂ poly(PDMA + TMMDA/DAMs)imide Solsperse 76400 Solsperse 12000 polyvinylpyrrolidone 15K MW BYK-9133 | 0.44 0.44 12.04 0.72 0.13 0.07 0.22 0.96 | 0.470 | 0.321 | 1.222 | 0.50 |

TABLE 4-continued

| ink ID | process (A or B) | millgrind(s) component | millgrind wt. % ID | MV | D50 | D95 | % > 3 nm | cathode ink component | wt. % | MV | D50 | D95 | % > 3 nm |
|---|---|---|---|---|---|---|---|---|---|---|---|---|---|
| | | BYK-9133 | 2.00 | | | | | LiTFSI | 0.45 | | | | |
| | | NMP | 73.00 | | | | | NMP | 84.53 | | | | |
| Example 6 JB01-56-1 repeat of KB01-81-INK | B | Carbon black (Timcal Super C65) | 6.00 RG01-11 | 0.318 | 0.232 | 0.846 | 0.00 | Carbon black (Timcal Super C65) | 0.88 | 0.479 | 0.392 | 1.125 | 0.00 |
| | | Solsperse 76400 | 1.80 RG01-09 | 0.194 | 0.179 | 0.374 | 0.00 | Solsperse 76400 | 0.26 | | | | |
| | | Solsperse 12000 | 0.90 | | | | | Solsperse 12000 | 0.13 | | | | |
| | | NMP | 91.30 | | | | | $MnO_2$ | 12.04 | | | | |
| | | $MnO_2$ | 25.00 | | | | | poly(PDMA + TMMDA/DAMs)imide | 0.72 | | | | |
| | | BYK-9133 | 2.00 | | | | | LiTFSI | 0.45 | | | | |
| | | NMP | 73.00 | | | | | BYK-9133 | 0.96 | | | | |
| | | | | | | | | NMP | 84.56 | | | | |
| Example 7 JB01-56-2 | B | Carbon black (Timcal Super C65) | 6.00 RG01-11 | 0.318 | 0.232 | 0.846 | 0.00 | Carbon black (Timcal Super C65) | 0.88 | 0.491 | 0.339 | 1.668 | 0.06 |
| | | Solsperse 76400 | 1.80 RG01-09 | 0.194 | 0.179 | 0.374 | 0.00 | Solsperse 76400 | 0.26 | | | | |
| | | Solsperse 12000 | 0.90 | | | | | Solsperse 12000 | 0.13 | | | | |
| | | NMP | 91.30 | | | | | $MnO_2$ | 12.04 | | | | |
| | | $MnO_2$ | 25.00 | | | | | Kynar ADX-111 | 0.72 | | | | |
| | | BYK-9133 | 2.00 | | | | | LiTFSI | 0.45 | | | | |
| | | NMP | 73.00 | | | | | BYK-9133 | 0.96 | | | | |
| | | | | | | | | NMP | 84.56 | | | | |
| Comparative Example 1 JB01-58-1 | B | Carbon black (Arosperse 7) | 3.00 RG01-16 | 0.235 | 0.225 | 0.359 | 0.00 | Carbon black (Arosperse 7) | 0.88 | 0.361 | 0.303 | 0.660 | 0.00 |
| | | Makon 10 | 1.50 RG01-22 | 0.234 | 0.216 | 0.407 | 0.00 | Makon 10 | 0.44 | | | | |
| | | NMP | 95.50 | | | | | $MnO_2$ | 12.00 | | | | |
| | | $MnO_2$ | 25.00 | | | | | poly(PDMA + TMMDA/DAMs)imide | 0.72 | | | | |
| | | BYK-9133 | 2.00 | | | | | LiTFSI | 0.45 | | | | |
| | | NMP | 73.00 | | | | | BYK-9133 | 0.96 | | | | |
| | | | | | | | | NMP | 84.55 | | | | |
| Comparative Example 2 JB01-58-2 | B | Carbon black (Arosperse 7) | 3.00 RG01-16 | 0.235 | 0.225 | 0.359 | 0.00 | Carbon black (Arosperse 7) | 0.88 | | | | |
| | | Makon 10 | 1.50 RG01-22 | 0.234 | 0.215 | 0.407 | 0.00 | Makon 10 | 0.44 | | | | |
| | | NMP | 95.50 | | | | | $MnO_2$ | 12.00 | | | | |
| | | $MnO_2$ | 25.00 | | | | | Kynar ADX-111 | 0.72 | | | | |
| | | BYK-9133 | 2.00 | | | | | LiTFSI | 0.45 | | | | |
| | | NMP | 73.00 | | | | | BYK-9133 | 0.96 | | | | |
| | | | | | | | | NMP | 84.55 | | | | |

Examples 1-7 and Comparative Examples 1 and 2 were tested for viscosity, resistance, and adhesion. The results are provided in Table 5 below.

TABLE 5

| | Viscosity at 45° C., 50 rpm (cP) | Resistance/Coating Thickness (W/mm) | Adhesion/Cohesion Tape Test |
|---|---|---|---|
| Example 1 | 11.6 | 0.120 | significant cohesive failure |
| Example 2 | 12.90 | 0.136 | significant cohesive failure |
| | 12.40 | 0.117 | |
| Example 3 | 6.08 | 0.139 | some cohesive failure |
| Example 4 | 14.50 | 0.040 | little cohesive failure |
| Example 5 | 9.48 | 0.097 | little cohesive failure |
| Example 6 | 5.10 | 0.243 | some cohesive failure |
| Example 7 | 4.05 | 0.075 | some cohesive failure |
| Comparative Example 1 | 4.25 | 27.7 | significant cohesive and some adhesive failure |
| Comparative Example 2 | 3.59 | 1.650 | slight cohesive, some adhesive failure |

Viscosity was measured using a Brookfield Model DV-II+ viscometer fitted with a small volume sample adaptor and using a SCR-18 spindle at 45° C. and 50 rpm.

The electrical insulative properties were determined by coating and curing the cathode material 130 on 23 micron thick nickel coated copper foil. Resistance is measured using a Rigol model DM3068 multimeter connected to a weighed custom-made fixture. The positive lead of the multimeter is connected to an upper pad which contacts the upper surface of the cathode layer and a negative lead which contacts the underside of the substrate. The gold plated contact pads are approximately one centimeter in diameter. Direct current resistance is measured by placing the cathode sample printed on the substrate between the upper and lower plates of the test fixture. Thickness of the printed cathode layer is measured using a Mitutoyo Model ID-H0530E digital micrometer, the cathode layer thickness is determined by subtracting the measured substrate thickness from the total thickness.

Adhesion of the cathode material 130 to the substrate was determined by tape tests. The cathode material 130 was coated onto a nickel-coated copper substrate and dried at 100° C. for 15 minutes. Using a standard ball point pen, a score is made in the cathode layer from one corner of the solid printed area diagonally across to the opposite corner and likewise with the other pair of corners forming an X pattern. A piece of adhesive tape is adhered partially covering the cathode material 130 and partially covering the uncoated nickel-coated copper substrate. The tape was removed quickly at a 150 degree angle. The cathode layer is then inspected visually for the extent of adhesive failure between the cathode layer and the substrate and for cohesive failure within the cathode layer as indicated by cathode material 130 adhering to the test tape. The results of the tests are shown in Table 5.

Electrolyte Material

In a further embodiment, the electrolyte material 132 of the present application includes a polymer, a salt, and a solvent. Ink jet printing technology may be utilized to apply the electrolyte material to a substrate during the manufacture of a battery.

The electrolyte material provides a physical separation between the anode layer and the cathode layer, and allows diffusion transport of the ionic salt from the anode to the cathode.

The electrolyte material may have flow characteristics to allow for the electrolyte material to be properly jetted from the heads. Such flow characteristics may be defined by viscosity, surface tension, or fluid solids content (NV). The viscosity may range from about 3.0 to 20.0 cP, preferably from about 3.0 cP to about 8.0 cP. The surface tension may range from about 30 dynes/cm to about 50 dynes/cm. The fluid solids content (NV) may range from about 0.5% to about 20.0%, preferably from about 1.0% to about 5.0%, and most preferably from about 1.0% to about 2.0%. In some embodiments, the electrolyte material is jetted from the print head at room temperature. In other embodiments, the print head may be heated to about 25° C. to about 55° C., preferably about 43° C.

In one embodiment, the electrolyte material may include from about 0.5% to about 2.5%, preferably from about 1.0% to about 1.5%, by weight of the polymer; from about 0.5% to about 5.0%, preferably from about 2.0% to about 3.0%, by weight of the ionic salt; and from about 80.0% to about 98.0%, preferably from about 95.0% to about 98.0%, by weight of the solvent.

Once the electrolyte material is applied to the substrate, a majority of the solvent is vaporized. Vaporization includes material changes to the gaseous state by active means such as heat or other similar processes as well as by passive means such as evaporation or other similar processes. The substrate onto which the electrolyte material is jetted may be maintained at an elevated temperature in the range from about 150° F. to about 300° F., preferably at about 290° F., to promote vaporization of the solvent. The temperature of the print head and/or the substrate may vary depending on the solvent.

The polymer suitable for use may be a polyimide, such as a terpolymer poly(pyromellitic dianhydride+3,3',5,5'-tetramethyl-4,4'-methylene dianiline/2,4,6-trimethyl-1,3-phenylenediamine])imide (poly (PDMA+TMMDA/DAMs) imide) by Solicore, Inc. (Lakeland, Fla.), and formed by reacting PMDA, 33.3 mole % DAMs and 66.7 mole % TMMDA. Another suitable polymer is a polyimide such as Matrimid 5218 by Huntsman (Salt Lake City, Utah). Other suitable polymers include a functionalized polyvinylidene fluoride homopolymer such as Kynar ADS by Arkema Chemical (King of Prussia, Pa.), a polyvinylidene fluoride homopolymer such as Kynar HSV 900 by Arkema Chemical (King of Prussia, Pa.), a polyvinylidene fluoride homopolymer such as Kynar 761 by Arkema Chemical (King of Prussia, Pa.), a polyvinylidene fluoride copolymer such as Kynar 2751 by Arkema Chemical (King of Prussia, Pa.), a polyvinylidene fluoride homopolymer such as Fluor Solef 5130 by Solvay (Houston, Tex.), a polyvinylidene fluoride homopolymer such as KF by Kureha (New York City, N.Y.), a VDF/TFE copolymer such as VT-475 by Daikin (Decatur, Ala.), a poly(vinylidene fluoride-tetrafluoroethylene-propylene) such as Dyneon BRE-7131X by 3M (St. Paul, Minn.), a poly(vinylidene fluoride) such as D-1 by Targray (Montreal, Canada), polyamide-imides, such as such as Torlon 4000T by Solvay (Houston, Tex.), to name a few. Mixtures of polymers may also be employed.

In one embodiment, the ionic salt may be lithium bis trifluoromethanesulfonimide (LiTFSI) such as HQ-115 by 3M (St. Paul, Minn.). Other suitable salts such as LiCl, LiBr, LiI, $LiPF_6$, $LiClO_4$, $LiB(C_2O_4)_2$, $LiAsF_6$, $LiBF_4$, $LiN(SO_2CF_2CF_3)_2$, or $LiCF_3SO_3$, may be used.

The solvent may be gamma butyrolactone (GBL), or, alternatively, N-methyl-pyrrolidone. Other suitable solvents include n-gamma valerolactone, N-methyl-2-pyrrolidinone, 3-methyl-oxazolidinone, tetramethylurea, dimethylsulfoxide, dimethylformamide, dimethylacetamide, methylethylketone, methyl isobutyl ketone, ethylene carbonate, propylene carbonate, dimethylcarbonate, ethylmethylcarbonate, diethylcarbonate, dimethoxyethane, dimethoxymethane, diethoxyethane, tetrahydrofuran, 2-methyl-tetrahydrofuran, 1,3-dioxolane, 4-methyl-1,3-dioxolane, 2-methyl-1,3-dioxolane, acetonitrile, methylacetate, ethylacetate, methyl butyrate, ethyl butyrate or any polar aprotic solvent and mixtures thereof. The evaporation rate of the solvent may range from about 0.01 to about 0.2, preferably from about 0.02 to about 0.1 at 25° C., based on the evaporation rate scale where n-butyl acetate is 1.0 at 25° C.

Preferably, dynamic surface tension ranges from about 30 dynes/cm to about 50 dynes/cm, Static surface tension ranges from about 30 dynes/cm to about 50 dynes/cm. Example surface tension modifiers are soluble in polar aprotic solvents. Such surface tension modifiers include non-ionic surfactants such as fluorosurfactants, alkyl pyrrolidinones, and the like, and anionic, cationic, zwitterionic surfactants. Alternatively the surface tension of the electrolyte material may be adjusted using a co-solvent with different surface tension than the primary solvent. Such solvents may include more volatile solvents of lower surface tension such as low molecular weight alcohols, for example, methanol, ethanol, 1-propanol, 2-propanol, 1-butanol, low molecular weight ethers, such as iso-propyl ether, low molecular weight amines such as iso-propyl amine, and low molecular weight aliphatic or aromatic compounds.

The layer of electrolyte material may be formed by multiple passes of the print head(s) in order to obtain the desired thickness. In some embodiments, the thickness may range from about 10 microns to about 30 microns, preferably from about 16 microns to about 22 microns. This thickness may be obtained by making up to 50 passes, preferably up to about 40 passes, and more preferably between about 20 passes and 30 passes, of the printing unit over the substrate, although the number of passes is dependent on various factors such as, for example, selection of the print head type, jetting performance, fluid solids content of the electrolyte material, and mass flow rate.

The following examples further illustrate the disclosure but, of course, should not be construed as in any way limiting its scope. Three example electrolyte materials useful in the present disclosure were prepared as follows:

filtration the electrolyte material is degassed under vacuum at about −27 inches of mercury with stirring for about 30 minutes. The degassed electrolyte material is then supplied to a Fujifilm Dimatix QS-80 printhead for evaluation of jetting performance, in particular the quality and consistency of drop formation and the mass flow rate through the print head. The print head is operated by firing all of the print head nozzles continuously at a frequency of 8.0 kHz. The electrolyte material supply vessel is maintained at −2 inches of water vacuum. According to the manufacturer's literature, the preferred viscosity range for the Dimatix QS-80 print head is between 8 and 20 cp. After printing and solvent evaporation, the electrolyte material composition of Example 1 shown above provides a satisfactory polymer membrane layer. However the jetting performance of Example 1 is problematic and is characterized by highly inconsistent droplet ejection leading to diminished mass flow from the print head and mist generation over the substrate. The low mass flow forces more passes over the substrate to dispose the required amount of polymer and lithium salt while the misting wastes material and may compromise the performance of the nearby adhesive layer on the substrate.

Surprisingly, it was found that by diluting the composition of Example 1 with additional solvent (in this case gamma butyrolactone) to a viscosity below the print head manufacturer's recommended range of 8 to 20 cp, the drop ejection performance could be greatly improved. This is described in Examples 2 and 3. As with example 1, a satisfactory polymer membrane layer is created with Examples 2 and 3.

More surprisingly even though the dilution lowered the concentration of active components in the electrolyte material composition (weight percent sum of polymer and lithium salt) the drop ejection quality improvement lead to a greatly increased mass flow rate from the print head thus lowering the number of passes to dispose the active components on the substrate and improving efficiency. Further, Example 2 shows that even though the mass flow rate from the print head is lower than Example 1, the net active component flow rate is higher since it is higher in the ink composition.

Jetting Application of Compositions

Figure 16:
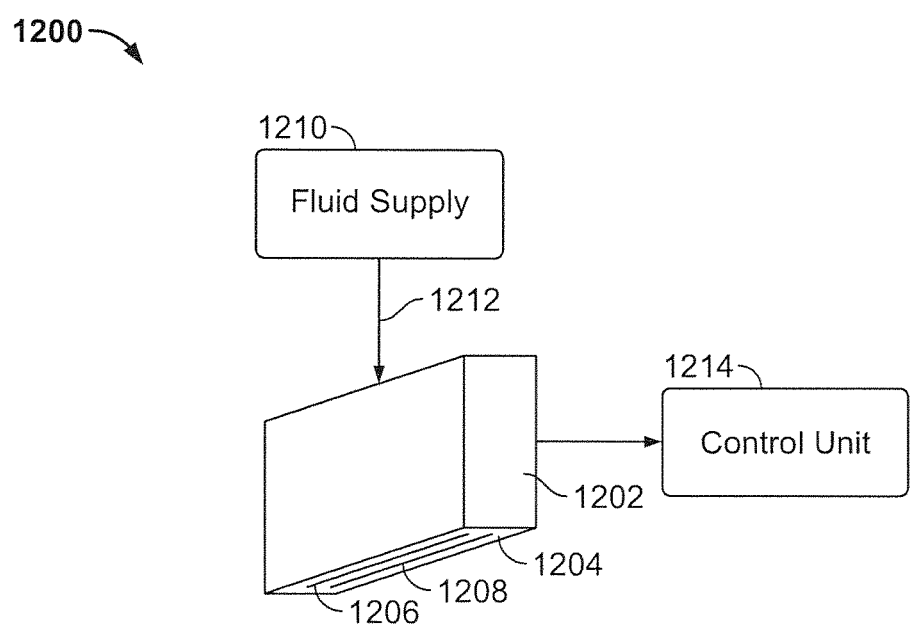
FIG. 16 is a schematic illustration of one embodiment of a device used for jetting battery materials.

Referring to FIG. 16, a material 1210 may be jetted using a device 1200 having a housing 1202 with a surface 1204. The jettable material 1210 may include an adhesive material 128, an insulator material 144, a cathode material 130, and/or an electrolyte material. The surface 1204 has a plurality of jet nozzles 1206, 1208. In FIG. 3, two rows of

|  | GBL (% by wt.) | poly (PDMA + TMMDA/ DAMs)imide (% by wt.) | LiTFSI (% by wt.) | Viscosity (at 32° C./ 50 rpm) (cp) | Print head mass flow (mg/s) | Active comp. flow rate (mg/s) |
| --- | --- | --- | --- | --- | --- | --- |
| Example 1 | 93.46 | 2.18 | 4.36 | 10.5–10.9 | 26.2 | 1.71 |
| Example 2 | 96.73 | 1.09 | 2.18 | 4.32 | 94.1 | 3.08 |
| Example 3 | 95.64 | 1.45 | 2.90 | 5.91 | 77.5 | 3.38 |

To prepare the electrolyte material, the solvent was placed in a vessel on a magnetic stirrer. The magnetic stirrer was started prior to adding the polymer. The polymer was sifted into the solvent in small increments with good agitation to prevent settling. Once the polymer is fully dissolved as indicated by a transparent solution, the ionic salt was then similarly sifted into the solvent to prevent settling.

Once the electrolyte material is thus prepared, it is filtered through a 1.5 micron rated glass fiber syringe filter. After nozzles 1206, 1208 are shown, although the device 1200 can have one or more rows of nozzles depending on the needed resolution. The housing 1202 includes a chamber (not shown) in communication with the nozzles 1206, 1208 and also in communication with a source 1210 of insulator material 144 via a tube or other communication media 1212. The device 1200 is controlled by a control device 1214 that may be any suitable print controller well known to this skilled in the art.

During the manufacturing of the battery, the jettable material 1210 may be jetted from a jet system containing a series of ink jet cartridges (e.g., bubble jet cartridges, thermal cartridges, piezoelectric cartridges, continuous ink jet systems, etc.). A bubble jet may emit a drop of liquid when excited by a heater. A piezoelectric system may eject a drop of liquid when excited by a piezoelectric actuator. The drop is emitted from a tiny hole in the jet cartridges. The cartridges may contain any number of holes. Commonly, jet cartridges can be found with six hundred holes, often arranged in two rows of three hundred. The jet units may be known print cartridge units such as those manufactured by Hewlett Packard, Lexmark, Spectra, Canon, etc. An example of a jet cartridge and jet head is described in Murakami et al. U.S. Pat. No. 7,240,998. Continuous systems are available from Kodak under the trade name Versamark.

The jet system or any of the jet systems as disclosed herein may be used to emit the jettable material 1210 from the ink jet cartridge(s). The jettable material 1210 may be jetted from one print head moving along the width of the substrate, or from multiple print heads jetting onto the substrate in-line. The substrate may move continuously through the print unit as the jettable material 1210 is jetted, or may remain static during jetting. The layer of jettable material 1210 may be formed by multiple passes of the print head(s) in order to obtain the desired thickness having sufficient adhesive strength.

Jetting performance is evaluated by drop size, nozzle wet-out, satellite formation or tailing (described in greater detail below), mass flow rate, and frequency response. Mass flow rate refers to the consistency of the flow through the nozzles over a period of time. The frequency response refers to the consistency of the performance over a range of speeds.

The jet system may be used to "print" or jet the jettable material 1210 having a shape onto the substrate. For example, a shape controller may receive shape data from a data system. The shape data may represent the shape to be printed. The shape data may include variable shape data that changes relatively frequently, semi-fixed shape data that changes less frequently, fixed shape data that remains static, and any combination of variable, semi-fixed, and fixed shape data. Some or all of the shape data may be stored as binary data, bitmap data, page description code, or a combination of binary data, bitmap data, and page description code. For example, a page description language (PDL), such as PostScript or Printer Command Language (PCL), may be used to define and interpret shape data in some embodiments. The data system may then electronically control jet system to print the shape represented by some or all of the different types of shape data (or any portion thereof) onto the substrate. In some embodiments, a vacuum source or heat source may be positioned next to or near jet system.

As is customary in the ink jet production art, any type of cleaning system may be utilized to clean the ink jet print heads.

Any of the systems or compositions described herein may be modified to allow formation of different drop sizes of the jettable material 1210. The drop size should be consistent to form a continuous, consistent layer of the jettable material 1210.

Any of the systems described herein may be modified to allow formation of different drop sizes of the jettable material 1210. In general, a higher resolution grid, that is a grid with 300 dpi or greater, along with matched drop size improves collection of the jettable material 1210. Also, as the dpi of the grid increases, the size of the drops that are most efficacious in general are smaller. A larger drop size is more susceptible to forced wetting of areas to be imaged. This forced wetting can cause a decrease in shape quality due to a reduction in print density. Such forced wetting can be minimized by the addition/removal of one or more constituents and/or changing or adjusting one or more physical properties of the jettable material 1210. For example, reducing certain surfactants may reduce ghosting while utilizing, adding, and/or substituting other surfactants may also improve shape quality.

Properties of the jettable material 1210 and of the substrate may be varied to achieve a desirable interaction between the shape that is printed with the jet system and the substrate. In particular, manipulating the viscosity of the jettable material 1210 to about 1 to about 30 cP (or mPa·s), in some embodiments preferably about 1 to about 20 cP, prevents flooding, that is forced wetting that loses the image, including ragged edges and lines, as well as minimizes ghosting. Ghosting may occur when jettable material 1210 migrates to out of the shape. In some embodiments, it may be important that the viscosity of the adhesive material 128 be maintained at a value less than 30 cP, in some embodiments preferably less than 20 cP (or mPa·s) to allow for the jettable material 1210 to be emitted from a thermal jet head. Other chemical and/or materials science properties might be utilized to reduce or eliminate this effect. The jettable material 1210 may also include a thixotropic fluid that changes viscosity under pressure or agitation. Manipulating the surface tension of the jettable material 1210 can also reduce spreading.

Another process variable is the substrate itself. One or more coatings may be applied thereto to alter the interaction of the jettable material 1210 with the substrate. In the case of other substrates, such as a circuit board, a plastic sheet, a film, a textile or other sheet, a planar or curved surface of a wall, or other member, etc., the surface to which the jettable material 1210 is to be applied may be suitably prepared, processed, treated, machined, textured, or otherwise modified, if necessary or desirable.

A still further option is to modulate/control the temperature of one or more process parameters. For example, one might elevate the temperature of the jettable material 1210 upon application thereof to the substrate to improve adherence and facilitate dispensing thereof. Alternatively, or in addition, the substrate may initially be heated during application of jettable material 1210 to control adhesion, drop shape/size, and the like, and/or the substrate may be chilled at some point in the process once the jettable material 1210 is applied thereto so that the viscosity of the jettable material 1210 is increased, thereby reducing spread of the jettable material 1210 into non-wetted areas.

One could further use multiple different liquids dispensed by separate jet devices that, when applied together, create a jettable material 1210 that has improved adherence and/or viscosity and/or other desirable characteristic. The liquids may be applied at the different or same temperatures, pressures, flow rates, etc.

The compositions, apparatuses, and methods disclosed herein are also relevant in other industries and other technologies, for example, textiles, pharmaceuticals, biomedical, and electronics, among others. For example, variably customizable adhesives having enhanced sealing properties or water or fire resistance may be selectively applied to webs of textiles such as may be used to manufacture clothing or rugs, and/or may be used various types of applications such as in the production of radio frequency identification ("RPM") tags on articles. Other industries may also benefit from selective application of an adhesive material 128 to a substrate.

It will be understood that the foregoing is only illustrative of the principles of the systems and methods disclosed herein, and that various modifications can be made by those skilled in the art without departing from the scope and spirit of such systems and methods. For example, the order of some steps in the procedures that have been described are not critical and can be changed if desired. Also, various steps may be performed by various techniques.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Lithium Material

In one embodiment, a lithium composition for the anode material 134 may include metallic lithium particles and a solvent that may be extruded onto a substrate during the manufacture of a battery.

In one embodiment, the anode material 134 is prepared in a separate system (hereinafter the "lithium system") that is coordinated with the battery system. The lithium system may include a printing unit and an extrusion die. Such extrusion process may allow for greater control over the shape and thickness of the lithium anode as desired for a particular size battery. Lithium is extremely reactive, and certain measures may be undertaken in order to minimize the possibility of fires.

The lithium composition may comprise metallic lithium particles such as Stabilized Lithium Metal Powder by INC Corp. (Philadelphia, Pa.), a lithium powder coated with a hydrocarbon polymer or other similar material. For example, the stable lithium metal powder may be formed by heating lithium metal powder in an inert atmosphere, for example, in the presence of a non-combustible hydrocarbon oil, to form a molten lithium metal. A variety of hydrocarbon oils may be used, such as mineral oil, petroleum, shale oils, paraffin oils, and the like. The molten lithium may then be dispersed using high sheer or other equivalent forces to form uniform droplets or particles of the lithium metal, and to facilitate the distribution of droplets or particles in the hydrocarbon oil while avoiding agglomeration. In other embodiments, other possible coatings include a wax, an organic coating such as mineral oil or petroleum-based oil, and a phosphoric coating that results in a lithium phosphate protective layer, among others. In one embodiment, the lithium particles are stabilized by a hydrocarbon polymer coating that is preferably processed in order to activate the lithium. Additionally, it may be desirable for the lithium particles to be substantially free of other metals.

The solvent enables the composition to be malleable and/or fluid, preferably without damaging the coating of the lithium particles. The solvent may be hexane, heptane, xylene, toluene, or other similar solvent. In some embodiments, at least a portion of the solvent may be vaporized and/or removed prior to activation of the lithium. The mixture of the metallic lithium particles and the solvent may have a viscosity in the range from about 50 Pa·s to about 250 Pa·s, preferably from about 150 Pa·s to about 175 Pa·s.

The substrate may be a film or sheet of polyethylene, or a metal such as aluminum or copper. In some circumstances, it may be desirable for the substrate to be a non-conductive film such as a polyethylene terephthalate. In other circumstances, it may be preferred for the substrate to be a conductive material such as nickel-coated aluminum. When an aluminum substrate is used, a non-lithium coated surface of the aluminum substrate that contacts any active portion of the battery other than the anode itself (i.e., the cathode or electrolyte material) may be covered with an insulating material to prevent a battery short. The layers of battery components may be modified based on the selection of anode substrate.

Prior to the extrusion of a lithium composition, a boundary may be jetted using an ink jet print head of the printing unit onto the substrate. The boundary disposed on the anode substrate may be a physical barrier, such as an insulator material 144 or an adhesive material 128 having a sufficient thickness, or a thin oleophobic barrier that physically repels the lithium composition, to prevent the flow or spread of the lithium composition. In some embodiments, the boundary is formed by a boundary material comprised of a polymer and a solvent. The polymer may be a linear copolyester, a poly(amide imide), a polyimide, or other suitable polymers, and combinations thereof. In some embodiments, at least a portion of the solvent may be vaporized.

Next, the lithium composition may be extruded from a micro-tip or micro-dispensing extrusion die onto the substrate or an intermediate layer of material atop the substrate. Multiple extrusion tips may be positioned along the width of the web to extrude the lithium composition in an in-line process. Alternatively, the extrusion may comprise a single tip that makes multiple passes over a particular area or shape outlined by the boundary.

The coating of the lithium particles may then be processed and the lithium may be activated. In one method of activation, the stabilizing coating may be displaced as the substrate travels through a calendaring system which allows the lithium particles to form a contiguous solid providing electrical continuity. The calendaring process may be undertaken in a dry room environment to control humidity, or the possibility of water exposure to the lithium.

In another method of activation, the stabilizing coating may be burned off during a flash fusion process, and the lithium particles may be fused into a contiguous solid that allows for electrical continuity. Due to the high reactivity of lithium, flash fusion may be undertaken in a controlled environment to prevent exposure of the lithium to air, water, and other natural elements. The controlled environment may include an enclosure or container around the flash fusion area that is filled with Argon or another stabilizing gas.

Once the lithium has been activated, a die cutter may cut an individual anode from the web within the lithium system. The individual anode may then be placed on top of the battery layers prior to the folding of the battery within the battery system.

It will be understood that the foregoing is only illustrative of the principles of the systems and methods disclosed herein, and that various modifications can be made by those skilled in the art without departing from the scope and spirit of such systems and methods. For example, the order of some steps in the procedures that have been described are not critical and can be changed if desired. Also, various steps may be performed by various techniques.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

INDUSTRIAL APPLICABILITY

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Accordingly, this description is to be construed as illustrative only and is presented for the purpose of enabling those skilled in the art to make and use the disclosure and to teach the best mode of carrying out same.

We claim:

1. An electrical insulator material comprising a polymer and a solvent, wherein the electrical insulator material has a viscosity in the range of from about 1.0 to about 20.0 cP such that the electrical insulator material can be applied to a surface in a layer using an ink jet print head and heated to form a void-free continuous film; and
    wherein the polymer is present in an amount from about 0.5% to about 6.0% by weight, wherein the solvent is present in an amount from about 30.0% to about 99.5% by weight, and wherein the polymer comprises a poly(amide imide), a linear copolyester, or a combination thereof.

2. The electrical insulator material of claim 1, wherein the viscosity is in the range of from about 3.4 cP to about 5.5 cP.

3. The electrical insulator of claim 1, wherein the electrical insulator material has a dynamic surface tension in a range from about 25 dynes/cm to about 45 dynes/cm.

4. The electrical insulator material of claim 1, wherein the solvent comprises n-methyl-2-pyrrolidone.

5. The electrical insulator material of claim 1, wherein the insulator material does not degrade in gamma butyrolactone.

6. The electrical insulator material of claim 1, further comprising a crosslinking agent.

7. The electrical insulator material of claim 1, further comprising a device for use in an ink jet print operation comprising:
    a housing;
    a series of ejection nozzles mounted within the housing, each ejection nozzle capable of ejecting a drop on demand; and
    a source of the electrical insulator material communicating with the nozzles.

8. The electrical insulator material of claim 1, wherein the insulator material is disposed in a layer having a thickness of about 25 microns to about 100 microns.

9. The electrical insulator material of claim 8, wherein the insulator material is disposed in a layer having a thickness of about 35 microns to about 45 microns.

10. The electrical insulator material of claim 1, wherein the surface is one of a substrate and an intermediate layer disposed on the substrate.

11. The electrical insulator material of claim 10, wherein the intermediate layer is an adhesive material.

12. An electrical insulator material comprising a polymer and a solvent, wherein the electrical insulator material has a viscosity in the range of from about 1.0 to about 20.0 cP such that the electrical insulator material can be applied to a surface in a layer using an ink jet print head and heated to form a void-free continuous film;
    wherein the polymer comprises a linear copolyester;
    wherein the linear copolyester is present in an amount of from about from about 1% to about 20% by weight and wherein the solvent is present in an amount of from about 1% to about 99% by weight; and
    wherein the solvent comprises toluene, xylene, and cyclohexanone, and combinations thereof.

13. A method of manufacturing a battery using an ink jet print head comprising the steps of:
    jetting an electrical insulator material onto a surface, wherein the electrical insulator material comprises a polymer and a solvent and has a viscosity in the range of from about 1.0 to about 20.0 cP such that the electrical insulator material can be applied to a surface in a layer using an ink jet print head and heated to form a void-free continuous film, and wherein the polymer is present in an amount from about 0.5% to about 6.0% by weight, wherein the solvent is present in an amount from about 30.0% to about 99.5% by weight, and wherein the polymer comprises a poly(amide imide), a linear copolyester, or a combination thereof; and
    vaporizing a portion of the solvent.

14. The method of claim 13, wherein the viscosity is in the range of from about 3.4 cP to about 5.5 cP.

15. The method of claim 13, wherein the electrical insulator material forms a layer having a thickness of about 25 microns to about 100 microns.

16. The method of claim 13, wherein the electrical insulator material forms a layer having a thickness of about 35 microns to about 45 microns.

17. The method of claim 13, wherein the electrical insulator material forms a layer having an electrical resistance greater than 125 megaohms.

18. The method of claim 17, wherein the electrical insulator material forms a layer having an electrical resistance greater than 550 megaohms.

19. The method of claim 13, wherein the electrical insulator material is jetted from an ink jet print head, and the method further comprises relative movement of the ink jet print head over the substrate to form a layer thereon.

20. The method of claim 13, wherein the surface comprises one of a substrate and an intermediate layer atop the substrate.

21. The method of claim 20, wherein the intermediate layer is an adhesive material.

22. The method of claim 13, wherein the substrate is heated to promote vaporization of the solvent.

\* \* \* \* \*